(12) United States Patent
Harel et al.

(10) Patent No.: US 7,213,230 B2
(45) Date of Patent: May 1, 2007

(54) PLAYING SCENARIOS OF SYSTEM BEHAVIOR

(75) Inventors: David Harel, Jerusalem (IL); Rami Marelly, Rishon Le Zion (IL)

(73) Assignee: Yeda Research and Development Co. Ltd. (IL)

( * ) Notice: Subject to any disclaimer, the term of this patent is extended or adjusted under 35 U.S.C. 154(b) by 362 days.

(21) Appl. No.: 10/034,433

(22) Filed: Dec. 27, 2001

(65) Prior Publication Data

US 2002/0100015 A1    Jul. 25, 2002

Related U.S. Application Data

(63) Continuation-in-part of application No. 09/815,123, filed on Mar. 22, 2001, now abandoned.

(60) Provisional application No. 60/258,507, filed on Dec. 28, 2000.

(51) Int. Cl.
G06F 9/44 (2006.01)
(52) U.S. Cl. .................................... 717/113
(58) Field of Classification Search ............... 717/105, 717/109; 345/763
See application file for complete search history.

(56) References Cited

U.S. PATENT DOCUMENTS

| | | | |
|---|---|---|---|
| 5,852,825 A * | 12/1998 | Winslow | 707/6 |
| 5,910,897 A * | 6/1999 | Dangelo et al. | 716/19 |
| 6,205,575 B1 * | 3/2001 | Sherman et al. | 717/100 |
| 6,353,896 B1 * | 3/2002 | Holzmann et al. | 717/143 |
| 6,415,396 B1 | 7/2002 | Singh et al. | |
| 6,606,740 B1 | 8/2003 | Lynn et al. | |
| 2001/0033340 A1 | 10/2001 | Yui | |
| 2002/0194393 A1 | 12/2002 | Hrischuk et al. | |

OTHER PUBLICATIONS

Harel, D., "State charts: A Visual Formalism for Complex Systems", *Sci. Comput. Prog.* 8 (1987), pp. 231-274.

Harel, D., "From Play-In Scenarios To Code: An Achievable Dream", *IEEE Computer*, 34:1 (Jan. 2001), pp. 53-60.

Damm, W. and Harel, D., "LSCs: Breathing Life into Message Sequence Charts", Proc. 3rd IFIP Int. Conf. On Formal Methods for Open Object-based Distrubuted Systems, *Kluwer Academic Publishers*, (1999), pp. 293-312.

Harel D. and Kugler H., "Synthesizing State-Based Object Systems from LSC Specifications", *The Weizmann Institute of Science, Rehovot, Israel, Report MCS99-20*, (1999), http://www.wisdom.weizmann.ac.il/reports.html.

(Continued)

*Primary Examiner*—Mary Steelman
*Assistant Examiner*—Qamrun Nahar
(74) *Attorney, Agent, or Firm*—Fitch, Even, Tabin & Flannery

(57) ABSTRACT

There is proposed a methodology for specifying the behavior of reactive systems, which is based on "Playing in" the system's possible scenarios. The use of this methodology is shown by building a practical "Play In Engine" tool based on the methodology. Users will be able to connect their Mock-Up GUI to the tool by "playing" their GUI and specifying the required system reactions in a simple and intuitive manner. As this is being done, the system will automatically generate behavior specifications in the language of Live Sequence Charts (LSCs), or any other suitable requirement language, such as various temporal logics or timing diagrams. On the basis of the system behavior specification, the user can play out scenarios through a play out engine.

48 Claims, 33 Drawing Sheets

OTHER PUBLICATIONS

Alur, Rajeev; Etessami, Kousha and Yannakakis, Mihalis, Interference of Message Sequence Charts, ICSE, 2000, pp. 304-313, Limerick, Ireland.

Ladkin, Peter B. and Leue, Stefan, An Analysis of Message Sequence Charts, University of Berne, Institute for Informatics and Applied Mathematics, IAM 92-103, Jun. 1992, Bern, Switzerland.

* cited by examiner

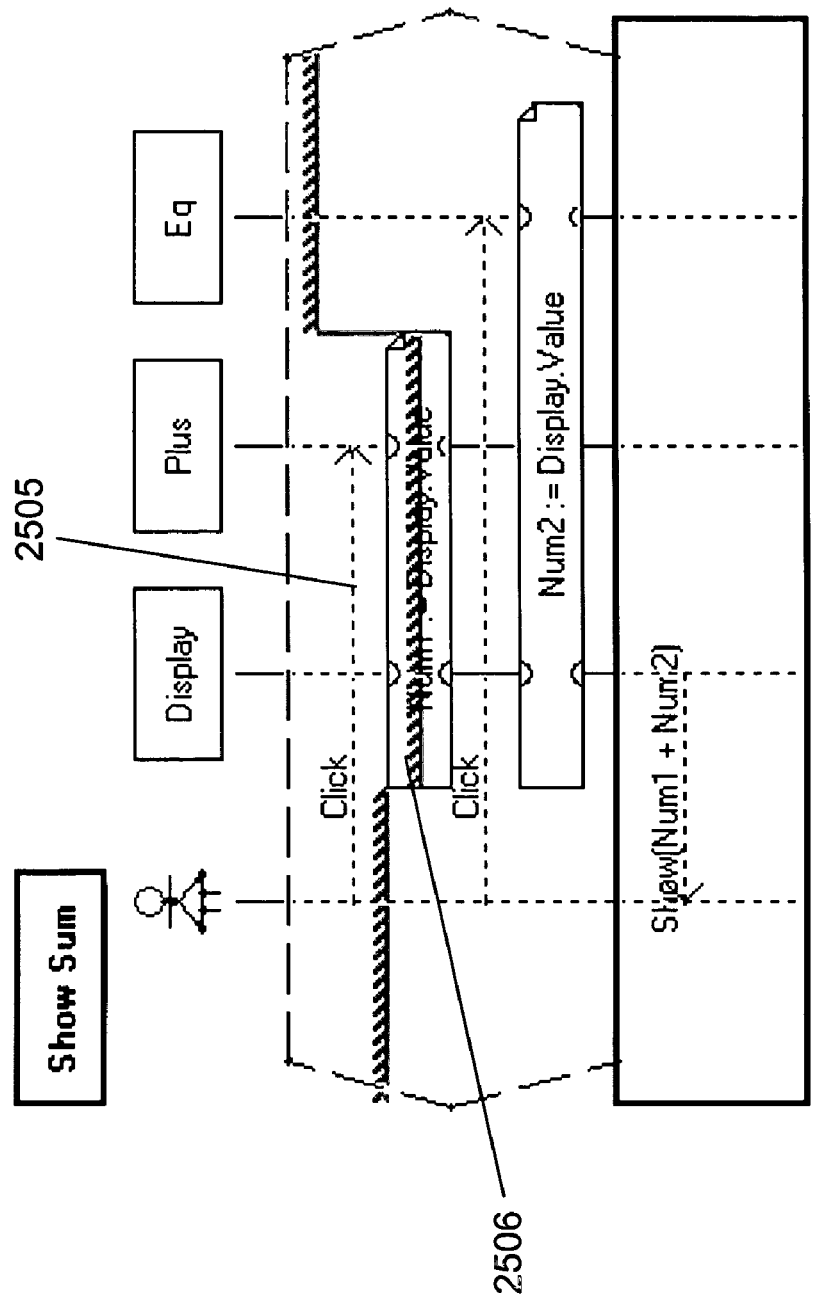

PLAYING SCENARIOS OF SYSTEM BEHAVIOR

This application is a continuation-in-part of application Ser. No. 09/815,123 filed Mar. 22, 2001 now abandoned and claims the benefit of U.S. Provisional Application 60/258,507 filed Dec. 28, 2000 both of which prior applications are hereby incorporated by reference.

FIELD AND BACKGROUND OF THE INVENTION

Object orientation has been the most dominant methodology for developing software systems in the last two decades. Object oriented modeling (OOAD—Object Oriented Analysis and Design) started to show up in the late 1980's and has been used to "lift" concepts from the programming language level to a more abstract level using visual formalisms. The basic structural model for objects features a graphical notation for such OO notions as classes and instances, relationships and roles, and aggregation and inheritance. As to system behavior, there are two aspects that have to be modeled, the intra-object behavior which describes the way each one of the instances behaves, and the inter-object behavior which describes the interaction between objects in different possible scenarios of the system. As for the first aspect, most object-oriented modeling approaches adopted the statecharts language [1]. Each class is associated with a statechart that describes the behavior of the class instances. As for the second aspect, the most widely used language is message sequence charts (MSCs), adopted long ago by the International Telecommunication Union. MSCs is a visual language used to describe possible scenarios of a system behavior. In this language, objects are drawn as vertical lines and the communication between these objects is denoted by messages (horizontal lines going from the sending object to the receiving one). Messages in the language of MSCs may describe a wide variety of 'real' communications, such as actual messages sent on communication lines between computers, exchanging information using shared memory on a single machine, or even calling functions of one object by another one. Use cases were introduced in order to model the system by identifying the different observable behaviors and interactions of the system with the user.

In 1997 the Object Management Group (OMG) adopted the standard of UML (Unified Modeling Language) This standard encapsulates most of the ideas and notions mentioned above and brings them together as a single worldwide accepted standard. According to most UML-based methodologies for system development, the user first specifies the system's use cases. Then, the implementation of each use case is described using sequence diagrams (the UML name for MSCs). In a later modeling step, the behavior of each object is described by an associated statechart. Finally, each object is implemented as code in a specific programming language. Thus, for example, a use case may specify generally that "a client draws cash in an Automatic Teller Machine (ATM)". This generalized observable behavior is described in a sequence of diagrams referring specifically to the various sequence of operations that constitute the use case of drawing cash. Thus, for example, a sequence diagram describes the step of feeding-in the client PIN and specifies a different treatment for (i) correct PIN or (ii) in-correct PIN (the latter allows, e.g. two additional retries). A specific sequence diagram is further provided for drawing cash within the client's authorized credit, or alternatively if the clients attempts to draw an amount which exceeds his/her credit (giving him/her opportunity to draw smaller amount), etc.

The process described above of specifying and developing systems can be partially automated (see a general discussion of this in [2]) and there are actually different implementations of some of the process steps. The most advanced automated part of the process is that of code generation from object diagrams and their statecharts, as implemented by two tools: RoseRT (by ObjectTime Inc.) and Rhapsody (by I-Logix Inc.). In 1999, Damm and Harel provided a rather extensive expansion of the system behavior specification language of MSCs to live sequence charts (LSCs) [3].

LSCs distinguish between scenarios that may happen in the system (existential) from those that must happen in it (universal). LSCs can further specify what messages may be accepted (cold) and what messages must (hot). Conditions are also handled with higher importance than in MSCs. Conditions may be cold, meaning that the condition may be true, or hot, meaning it must be true (otherwise the system aborts). Since its expressive power is far greater than that of MSCs, the language of LSCs makes it possible to attempt and transits between the first two modeling steps: LSCs and statecharts. Thus, in a recent paper [4], an algorithm for synthesizing statecharts automatically from LSCs specification is given, providing a first-cut treatment of automatically converting LSCs to statecharts. However, the transition from use cases to LSCs (or, for that matter, MSCs or any other language that describes inter-object behavior), is still done manually and is considered an art or a craft, besides requiring a deep knowledge of both the syntax and semantics of LSCs (or other specification languages). Before turning to FIG. 1, there follows a brief overview of system modeling. An indispensable part of any serious modeling approach is a rigorous semantical basis for the model constructed—notably, for the behavioral parts of the model and their connection with the structure. It is this semantics that leads to the possibility of executing models and running actual code generated from them (The code need not necessarily result in software; it could be in a hardware description language, leading to real hardware implementation). Obviously, if it is possible to generate full code, this code would eventually serve as the basis for the final implementation. Some current tools, like Statemate and Rhapsody from I-Logix, Inc., or Rose RealTime from Rational Corp. are in fact capable of producing quality code, good enough for the implementation of many kinds of reactive systems. And there is no doubt that the techniques for this kind of 'super-compilation' from high-level visual formalisms will improve in time. When developing a complex system, it is very important to be able to test and debug the model prior to investing extensively in implementation. Hence the desire for executable models. The basis for testing and debugging by executing the model are the requirements, which, by their very nature, constitute the constraints, desires and hopes concerning the system under development. It would be highly desired that both during development and afterwards that the system does, or will do, what it is intended to do.

The overall system modeling and design life cycle as practiced today is illustrated in FIG. 1, taken from [2]. Solid lines indicate that the used methodologies are automated or close to be, whereas dashed lines indicate methodologies that are not supported by any tools.

There is a need in the art to provide for a tool that offers playing-in and/or playing-out scenarios.

RELATED ART REFERENCES

[1] Harel, D., "Statecharts: A Visual Formalism for Complex Systems", *Sci. Comput. Prog.* 8 (1987), pp. 231–274.
[2] Harel, D., "From Play-In Scenarios To Code: An Achievable Dream", *IEEE Computer*, 34:1 (January 2001), pp. 53–60. Early version in Proc. Fund. Appr.. to Soft. Eng., Springer-Verlag, March 2000, pp. 22–34.
[3] Damm, W., and D. Harel, "LSCs: Breathing Life into Message Sequence Charts", *Proc. 3rd IFIP Int. Conf. on Formal Methods for Open Object-based Distributed Systems*, (P. Ciancarini, A. Fantechi and R. Gorrieri, eds.), Kluwer Academic Publishers, pp. 293–312, 1999.

SUMMARY OF THE INVENTION

The invention provides for a method for specifying a system behavior, comprising:
  (i) providing a system Graphic User Interface (GUI); the system GUI includes objects; the system GUI is associated with data structure describing at least the GUI objects; the method includes performing steps tat include the following steps (ii) and (iii), as many times as required:
  (ii) playing-in a scenario utilizing the system GUI, the scenario is representative of at least one use case; and
  (iii) constructing formal system behavior specification that corresponds to the scenario.

The invention further provides for an apparatus for specifying a system behavior, comprising:
  a system Graphic User Interface (GUI) that includes objects and associated with data structure describing at least the GUI objects; the apparatus includes a Play-Engine configured to perform at least the following, as many times as required:
  (i) playing-in a scenario utilizing the system GUI, the scenario is representative of at least one use case; and
  (ii) constructing formal system behavior specification that corresponds to the scenario.

Still further, the invention provides for a method for playing out scenarios in a system, comprising:
  (i) providing a system Graphic User Interface (GUI) that includes objects; the system GUI is associated with data structure describing at least the GUI objects;
  (ii) providing a formal system behavior specification; performing the following step as many times as required:
  (iii) playing-out a scenario utilizing the system GUI and the system behavior specification.

Yet further, the invention provides for an apparatus for playing out scenarios in a system, comprising:
  a system Graphic User Interface that includes objects and associated with data structure describing at least the GUI objects;
  a formal system behavior specification;
  a play-out engine configured to perform at least the following as many times as required: playing-out a scenario utilizing the system GUI and the system behavior specification.

BRIEF DESCRIPTION OF THE DRAWINGS

For a better understanding, the invention will now be described by way of example only, with reference to the accompanying drawings, in which;
FIGS. 25A–E show consecutive screen layouts illustrating an exemplary partial play-out session of a calculator application, in accordance with one embodiment of the invention.

DETAILED DESCRIPTION OF THE INVENTION

The invention will now be described by way of example only with reference to a preferred embodiment. There is proposed a methodology, supported by an assisting tool—the Play-In Engine, to describe the system's use cases by a formal visual specification language. This language can be any language that is able to capture possible scenarios of system behavior and has sufficient expressive power to describe liveness and safety properties. The tool built translates the system behavior into a set of LSCs. Each LSC describes a scenario of the use case. The main idea of the methodology is to raise the level of abstraction of requirement engineering, enabling engineers who are not familiar with the syntax and semantics of LSCs, or even potential users, to specify the behavioral requirements of the system using a high level mechanism, namely "Play-In". Before the user can start with the Play-in procedure, he/she is provided (either by building it on his/her own or receiving it from another source) with a GUI of the system (21 in FIG. 2A) that has no logic built into it. The system provided may contain real graphical objects such as buttons, switches, LEDs, or any other input and output devices. Instead or in addition, the GUI system may contain objects that represent real-life objects that are internal to the system, such as CPUs, controllers, or any other components used to construct the system. In the case of systems where there is a meaning to the layout of hidden internal objects (e.g., a board of an electrical system), the system GUI may also (or instead) include object or objects in the form of a graphical representation of the layout map. Any combination of the specified objects may be used. Moreover, other objects may be used in a system GUI in addition or in lieu of the above, all as required and appropriate, depending upon the particular application. Those versed in the art will appreciate that GUI is only a non limiting example of a system GUI.

Figure 1:
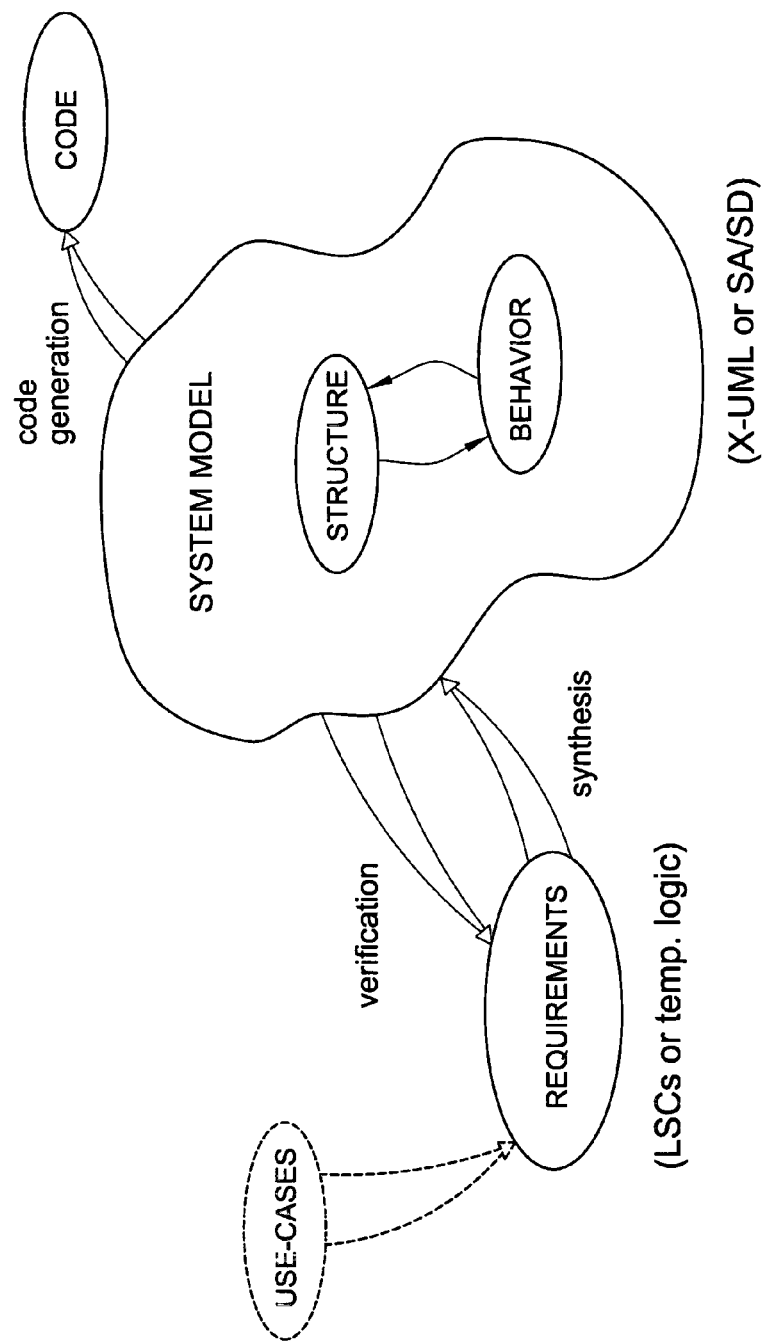
FIG. 1: illustrates schematically a system modeling and design in accordance with the prior art.
Figure 2A:
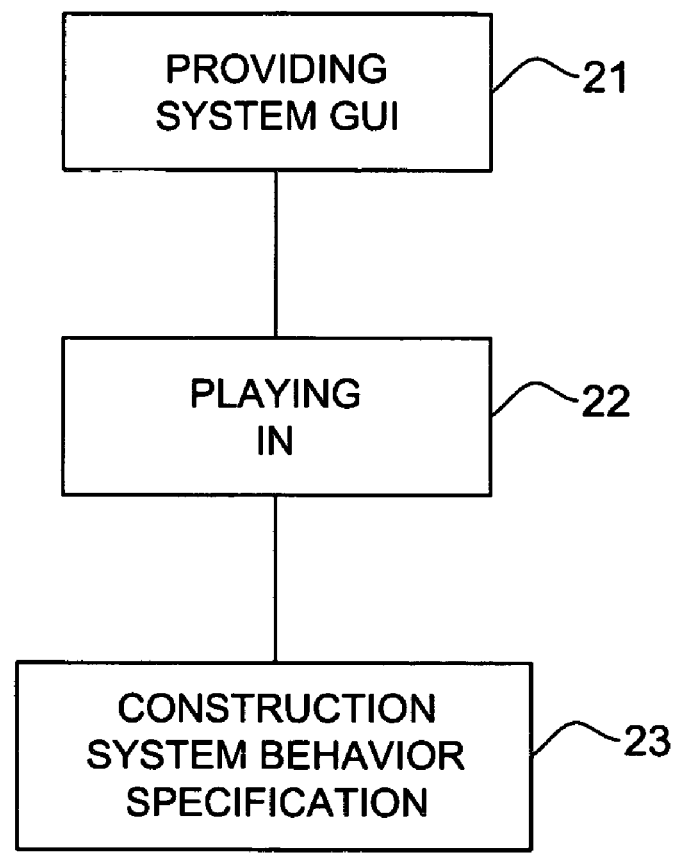
FIG. 2A illustrates a generalized block diagram of the operational steps of a play-in module, in accordance with an embodiment of the invention.

Actually, what "Play-In" means is that the user, specifying the behavior of the system, after being provided with the graphical representation, "plays" it by operating the objects (22 in FIG. 2A). Operating objects includes, for example, one or more of the following: clicking buttons, rotating knobs, turning switches, setting values for displays or any other action used to specify the value of input, output, internal devices or indicators.

The "operating object" action(s) can apply to internal objects and/or to specifying interaction (such as communication) between internal objects or between internal object(s) and one or more input/output object. This interaction between the objects is realized e.g. by sending messages (calling functions) between the objects at the GUI level in an intuitive manner, e.g. by using drag and drop operations.

A typical, yet not exclusive, scenario of using the specified object operation for system behavior specification would be that the user specifies actions (e.g. operating objects such as clicking buttons), and "describes" the system reaction and optionally the assignments/condition(s) that may or must hold regarding one or more of the operated objects, using the same techniques (e.g. operating objects—such as displaying the so clicked value on the display and storing the so displayed value for future use). The objects operated in the system reaction mode may be the same, different or partially overlapping to those of the user action mode, depending upon the particular application. This procedure may be repeated as many times as required to accomplish the entire playing-in scenario. The system will continuously, on the fly, construct formal system behavior specification (23 in FIG. 2A) (e.g. in the form of sets of LSCs) from these play-in actions. To make this possible, there is provided in accordance with a preferred embodiment a "Play-in Engine") which will query the application provided by the user, and will interact with it in order to manipulate the information entered by the user, thus learning the desired behavior of the application, and build the appropriate LSCs automatically. Preferably, the application's state during the play-in operation is reflected in the GUI application. For example, consider an output object that is being operated (say, a light indicator that is turned on), the result is reflected in the system GUI. (i.e. the light indicator is portrayed in its "turn on" state).

Figure 2B:
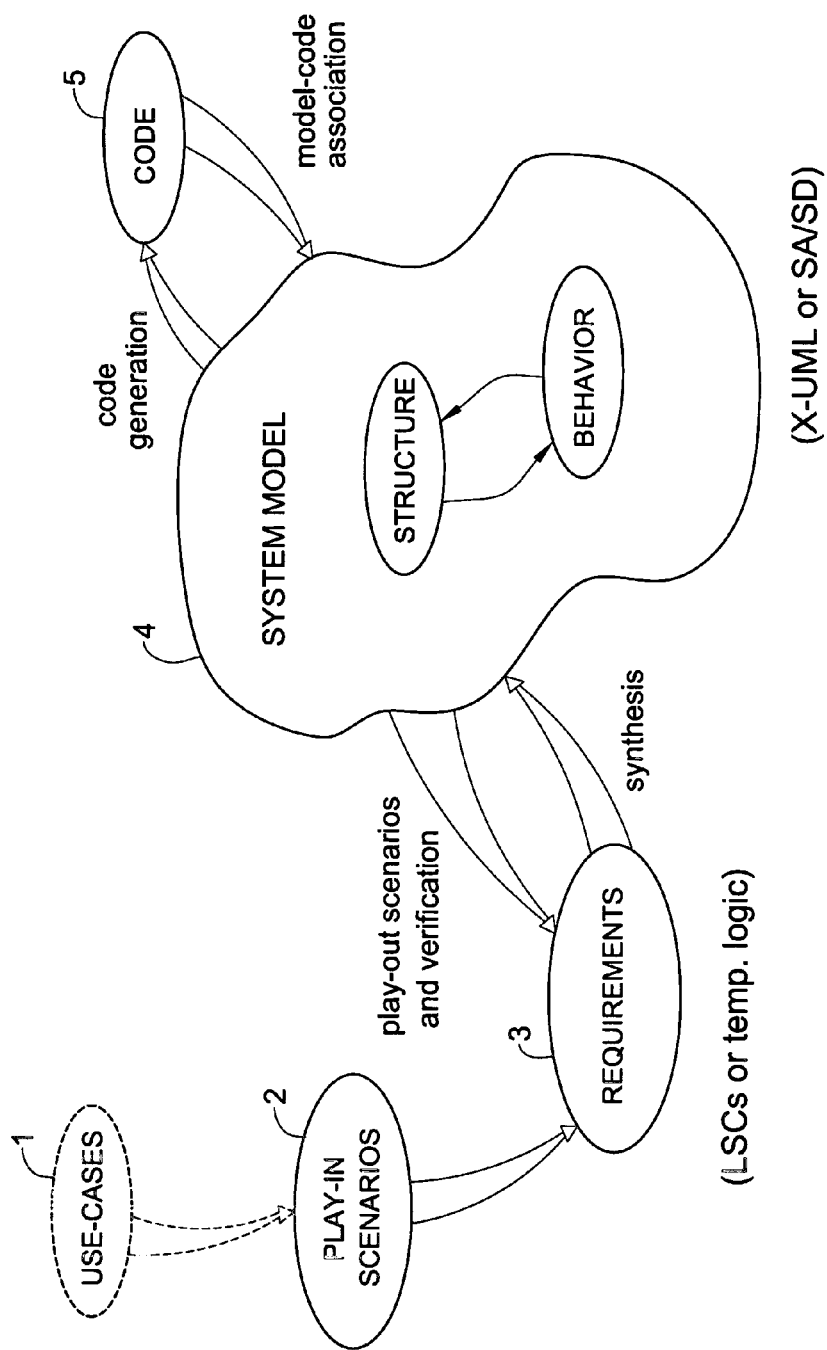
FIG. 2B illustrates schematically a system modeling and design incorporating a Play-in/Play-out modules in accordance with a preferred embodiment of the invention.

The location of the Play-in scenario proposed methodology in the overall process of system modeling and design in accordance with a preferred embodiment is shown in 2 in FIG. 2B. Note that the solid line connecting this ellipse to 3 is due to the proposed Play-In Engine, 1 stands for the high level representation of the use case, 4 is the system model and 5 is the code implementation thereof.

Figure 3:
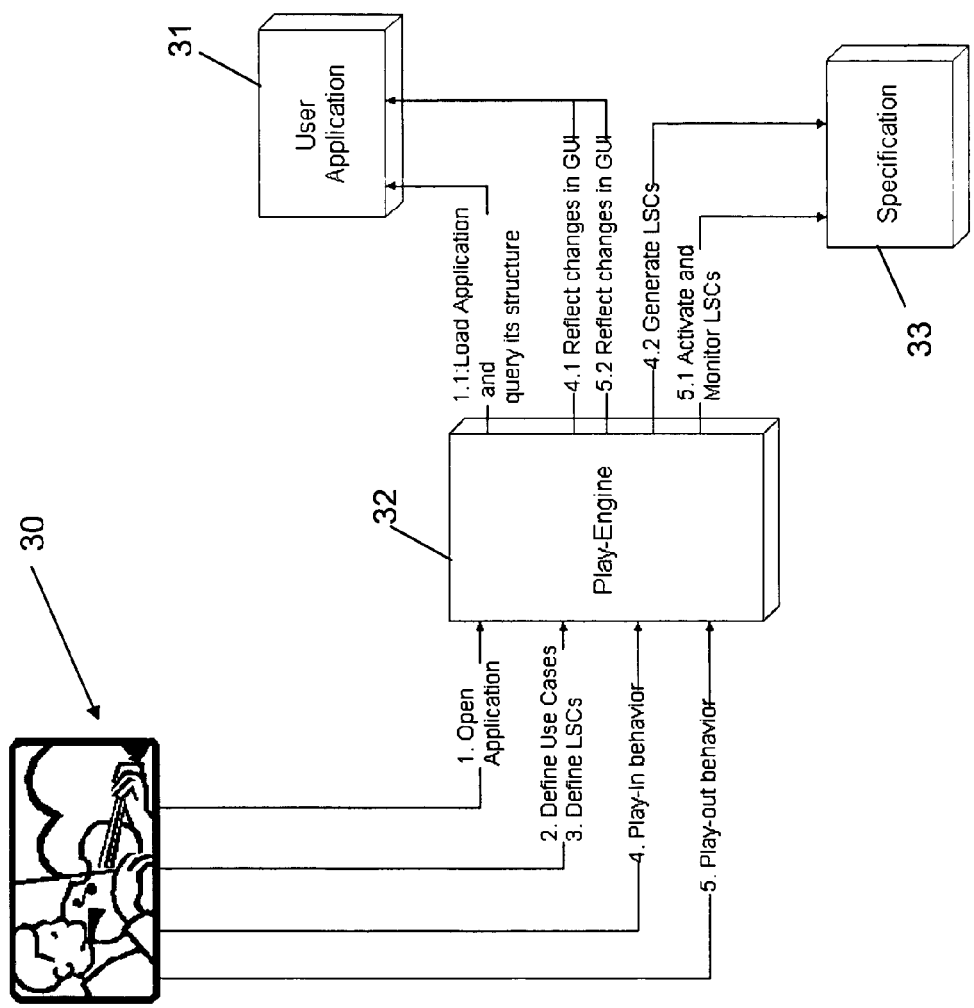
FIG. 3 illustrates, generally, a block diagram of a play engine in accordance with an embodiment of the invention.

By a preferred non-limiting embodiment, the Play-In Engine, will handle the following main subjects:

Turning now to FIG. 3, there is shown a generalized block diagram of a play engine in accordance with an embodiment of the invention. At this stage only the play-in aspects of the engine will be described whereas the play-out aspects will be described later. Thus, the user plays-in a desired scenario (designated schematically as (30)). The played-in scenario is typically fed through Graphic user interface of an application (31). The played-in input is fed to the play-engine module (32) which processes the input and generates a system behavior specification data, e.g. in the form of LSC charts (33). Note that whilst for clarity the play-in 30 (behavior) and the user application are presented as distinct modules, they are, as a rule, consolidated to a common module. Thus, in the example below (described with reference to FIGS. 4 to 15) a calculator GUI forms part of the user application and serves for playing-in.

Note that whilst in FIG. 3 the play-in engine serves for both play-in and play-out purposes, the invention is by no means bound by specific example. Thus, by way of another embodiment the play module may be configured to operate for either play-in or play-out modules, separately. Moreover, the depiction of the play engine as a distinct block is for simplicity only and, by no means, implies on the actual structure of the play-in module. Thus, by way of a non-limiting example the play-in module may be broken down into several software/hardware modules, all as required and appropriate, depending upon the particular application.

Querying and Activating the Application

In accordance with a preferred embodiment, the user may be provided with several GUI applications (which implement a pre-defined interface required by the engine) and select them from the Play-In Engine. The engine learns the objects defined in the application, and their types, and is able to show and hide the GUI automatically or on user demand, and activate its elements, by setting their values, highlighting them and querying them for their present values. If desired, the play-in engine can support more than one GUI simultaneously, enabling thus to implement more than one application. During the playing-in process the engine uses data structure that stored the relevant data (e.g. representations of the objects, etc.)

Defining Use Cases

In accordance with a preferred embodiment, the user will be able to define any number of use cases. Here, the connection (and tractability) between use cases and their implementation is given a far more rigorous basis than today. In current known methodologies, a domain expert writes a use case description in an informal language (or any similar format) and then has the system engineers describe its implementation formally using sequence diagrams. In the proposed methodology, abstract (yet formal) sequence diagrams (more generally, system behavior specification) are created automatically while the domain expert "plays in" the functionality of the system. The system engineers then continue from the same scenarios by adding objects and refining the system design incrementally.

Defining LSCs

It should be noted, generally, that for convenience, LSC is used as an exemplary formal system behavior specification language. The invention is by no means bound by this example.

In accordance with a preferred embodiment, the user will be able to cause automatic creation of sets of LSCs and (symbolically) connect them to use cases. The Play-In Engine provides a friendly environment to fix the type (existential or universal, called cold or hot in [3]) of messages, locations and conditions. The user will define conditions by operating objects as described before, and graphically determining the values of each object. The Play-In Engine will support common used types like numbers, colors, strings, buttons etc., in a more sophisticated way, thus enabling more advanced interfaces for controlling them. The user will cause construction of the LSCs by playing the GUI provided. The engine will be notified of the events and will simultaneously generate the desired LSC on its own. It should be further noted that, preferably, the reactions of the system will be reflected in the system GUI by graphically changing the values and states of objects in it (to thereby the application state).

Internal Objects

In accordance with a preferred embodiment, LSCs are also used to describe the interaction between internal (non-GUI) objects. The presented methodology handles these interactions that include sending messages to other objects and calling functions of them. The interaction between internal objects will be specified using preferably an intuitive graphical layout such as an object map—such as object model diagram (either defined or actually provided to or by the user) of the relevant objects. The user can specify actions by operating internal objects, e.g. sending messages between these objects at the graphical level in an intuitive manner, such as dragging arrows from the sending object to the receiving one. These interactions may and will usually be interlaced with GUI interactions in a single LSC.

At the start of the process of specifying a system, the user does not usually know which are all the objects that will constitute the system. The Play-In Engine will make it possible to declare new objects and new operations on the fly.

Object Connection Rules

In accordance with a preferred embodiment, many reactive and interactive systems have output components that display values reflecting the current state of the system. An example of such a component is the display of a pocket calculator. In these cases, a common LSC would contain arrows depicting the immediate reaction of the output object to a user action (e.g., the user pressed '3' and the display shows '3'). Since when specifying system behavior these reactions are not defined, the user should explicitly indicate the change in the output value each time. The Play-In Engine supplies an environment where the user may define connection rules that will be applied automatically whenever one event should trigger another one automatically. Defining connection rules is done in a rather intuitive manner e.g. by clicking the source and the target object and connecting them with one of several pre defined functions. These functions may be constant functions (e.g., when the user clicks the 'Clr' button, the display should always display '0') or other functions provided by the creator of the GUI application. The second type of functions may contain knowledge of the business logic from the application domain (e.g., when the user clicks a digit, the display is updated to show a new value which is computed by multiplying its, current value by 10 and adding the value of the last digit clicked).

The Play-In Engine stores all the connection rules, defined by the user, in a table, and whenever a relevant event occurs, it searches for an applicable rule. If such a rule is found, the engine generates the reaction specified in the rule, as if the user has specified it manually.

Note that the invention is by no means bound by a system GUI that signify a GUI (or GUIs) or internal object(s) in general, and/or by the specified GUI/internal object representation in particular. Accordingly any system GUI is applicable, depending upon the particular application. Thus, by way of a non-limiting example, LSC can describe a combination of internal objects and GUI of a system (constituting, collectively, a system GUI), say, GUI of calculator with the internal objects of the calculating module and display interface module.

Generalization and RandomLoops

While playing in the scenarios of a system, the automatically constructed LSCs are very specific, containing a small number of cases (e.g., in the pocket calculator, the user will describe a scenario where 7+9 are pressed and 16 is displayed at the end). "Play In Scenario" is indeed meant to be a friendly and intuitive methodology for describing the behavior of the system, but more importantly, it should have an expressive power that suffices to describe real systems.

Accordingly, by one embodiment, the Play-In Engine supplies friendly mechanisms to let the user indicate that some parts of an LSC are repeated in a loop for a specified or a random number of times. In accordance with this embodiment, the Play-In Engine enables defining exact messages and symbolic messages. An exact message will be repeated exactly as specified. In a symbolic message, the Play-In Engine may decide on new random input values (of the same kind as the original). For example, the user may play in a scenario where he/she specifies that 9+7 =16. Using symbolic messages, this can be shown as "X1"+"X2"="X1+ X2", thus giving the scenario a more general meaning.

Play Out Scenario

In accordance with an aspect of the invention, options are provided for playing-out a scenario. After specifying a part of the system behavior, or all of it, the user may start working with the GUI application as if it was an operational application and, if desired, it can actually function and the final system. The user will operate the objects as described before and the Play-Engine will follow the user actions and will make the application react to these actions according to the previously defined specification. The playing out option provides significant advantages. For example, the user actually tests the behavior of the specified system before implementing it and even before designing the objects that the system is built of. There follows, below, a more detailed discussion of the "play-out" aspect of the invention. Note, that whilst in a preferred embodiment, the playing-out is applied to LSCs which were generated in response to playing-in sequence, the invention, by this aspect, is not bound by this specific sequence of operation. Thus, by way of another embodiment, the play-out module is applied to LSCs which were not necessarily generated through the play-in module discussed above. In fact, other system behavior specifications, not necessarily in an LSC format, can be fed and processed by the play-out engine, all as required and appropriate.

It should be further noted that similar to the play-in module, the invention is not bound by any specific software/hardware realization of the play-out module. Accordingly, Play-out module should be regarded as a logical unit/module which can be implemented in any desired physical realization (e.g. software, hardware, combination thereof, using one processor multi-processors, using distinct module or few modules, etc., all as known per se). As specified above, the same generalization holds true also for play-in engine module.

Programming Tools and Technologies

As described above, in accordance with one embodiment the Play-Engine interacts with different a priori unknown system GUIs. In accordance with a preferred embodiment, there is a need for a technology that supports programming to an interface and runtime binding. Supporting these two properties means that two interfaces can be defined: one that will be implemented by the engine and will be known to the GUI-application developers, and another that the GUI-application must support. Thus, the Play-Engine can be run with systems developed later without having to be linked to them. For example, a technology that is used to this end is Microsoft's COM (Component Object Model), even though it could be developed in any other such environment such as, e.g. Java.

Rapid Prototype and Simulation Tools

Before building a new system, one usually builds a prototype or a mockup of the system to be built. There are several products that enable engineers to avoid building a real hardware mockup and instead to build a software prototype. Since the proposed product is designed to work with interfaces, users may write their GUI in any language they prefer, and even use a commercial prototyping tool. Put differently, third party utilities, such as Altia-Design™ commercially available from Altia Inc. may be utilized for building GUI of interest which is capable of communicating with the Play-Engine of the invention.

It is important to notice that even though the target specification language that the Play-Engine generates is the language of LSCs, the ideas and methodology are valid for any similar language (that serves for formal system behavior specification) that can express liveness and safety properties of system behavior. Examples of languages used to describe behavior or requirements about system behavior are:

Temporal Logic (several variants, such as CTL, LTL, CTL*)—a language of formulas using time quantifiers like Next, Always, Eventually, Until, etc.

MSCs, or UML sequence diagrams—a subset of LSCs that concentrates on the existential aspects of sequences (what may happen and not what must).

Symbolic Timing Diagrams—used mainly in the world of communication systems but may be used in other systems as well. Behavior is described as a set of changes in output values (ports) with respect to changes in input values. Timing constraints may be defined between events.

Timed Buchi Automata—finite automata on finite and infinite words that capture the system's possible states as states in the automaton, and possible events as transitions. Each automaton may be associated with a set of clocks, and constraints about these clocks may be defined over the automaton's transitions.

Anyone versed in the art should notice that the same principles used in the proposed methodology apply not only to LSCs, but also to any of the above languages (that are provided by way of example only); either in a straightforward manner or by format translations.

Likewise, the invention is not bound by the specific features of Querying and activating applications; Defining Use cases; Defining LSCs; handling internal objects; Object connection rules; Generalization and Random loops; Playing out scenarios; and Rapid prototype and simulation tools. Whether or not to use any of the specified features and modules depend upon the particular application. Moreover any of the specified features and modules may be modified, depending upon the particular application and/or other modules may be added all as required and appropriate.

In the following, there is given a non-limiting example of the interaction between the user and the Play-in Engine. The example is given as a set of figures showing the user's actions and the resulting diagrams and system reactions. In this example, the user is provided with a GUI of a pocket calculator, which he/she is about to play on. The example is "teaching" the application how numbers are added (the summing of the numbers stands for an exemplary use case). The user of the Play-In Engine, who designs the system, is referred to as the 'designer' and the end user of the system to be built is referred to as the 'user' (the one indicated in the LSC as the actor). Before turning to the example it should be noted that according to hitherto known techniques a designer would phrase in natural language the various procedures that constitute the above use case (adding of numbers). For example, such free text description may include:

i) Press Clr and Clear the display; (ii) key-in a first digit then (iii) key-in another digit and continue in a loop fashion; (iii) apply a rule which will display the so keyed digits as a number on the display; (iv) Then click an operator ("+") and in response store the so displayed first number in a variable. (v) Then, clear the display; (vi) repeat the procedure for the second number and store the so clicked second number if desired, repeat this procedure for additional numbers); (vii) await clicking of "=" and apply the "+" operator on the first and second (and others, if any) stored numbers. (ix) clear the display and display the Sum result on the screen.

This free, informal, description is then processed "manually" by designers who will manually construct corresponding LSC sequence charts. In the following, an alternative "playing-in" procedure in accordance with a specific embodiment of the invention is exemplified, obviating, thus the burdensome hitherto known manual procedure. Moreover, whereas in accordance with the invention the playing-in procedure is automatically reduced to LSC charts in an accurate fashion, the counterpart (burdensome) manual procedure in accordance with the prior art strongly depends on the skills of the designer (which naturally vary from one individual to the other) and is therefore inherently error prone.

Step 1: Initialization (described with reference to FIG. 4)

Figure 4:
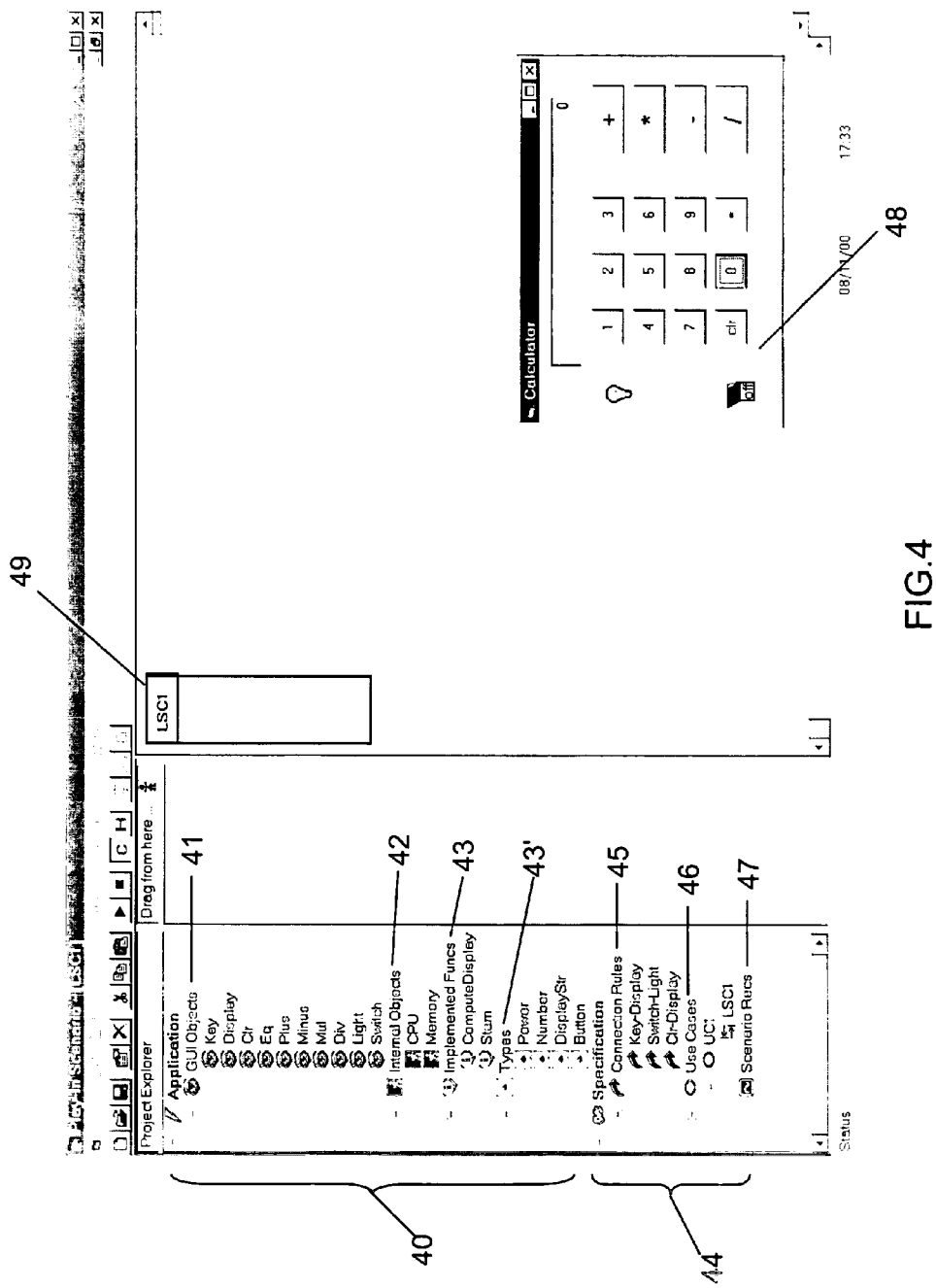
FIGS. 4–15 show twelve consecutive screen layouts illustrating an exemplary playing-in calculator application, in accordance with one embodiment of the invention.
Figure 5:
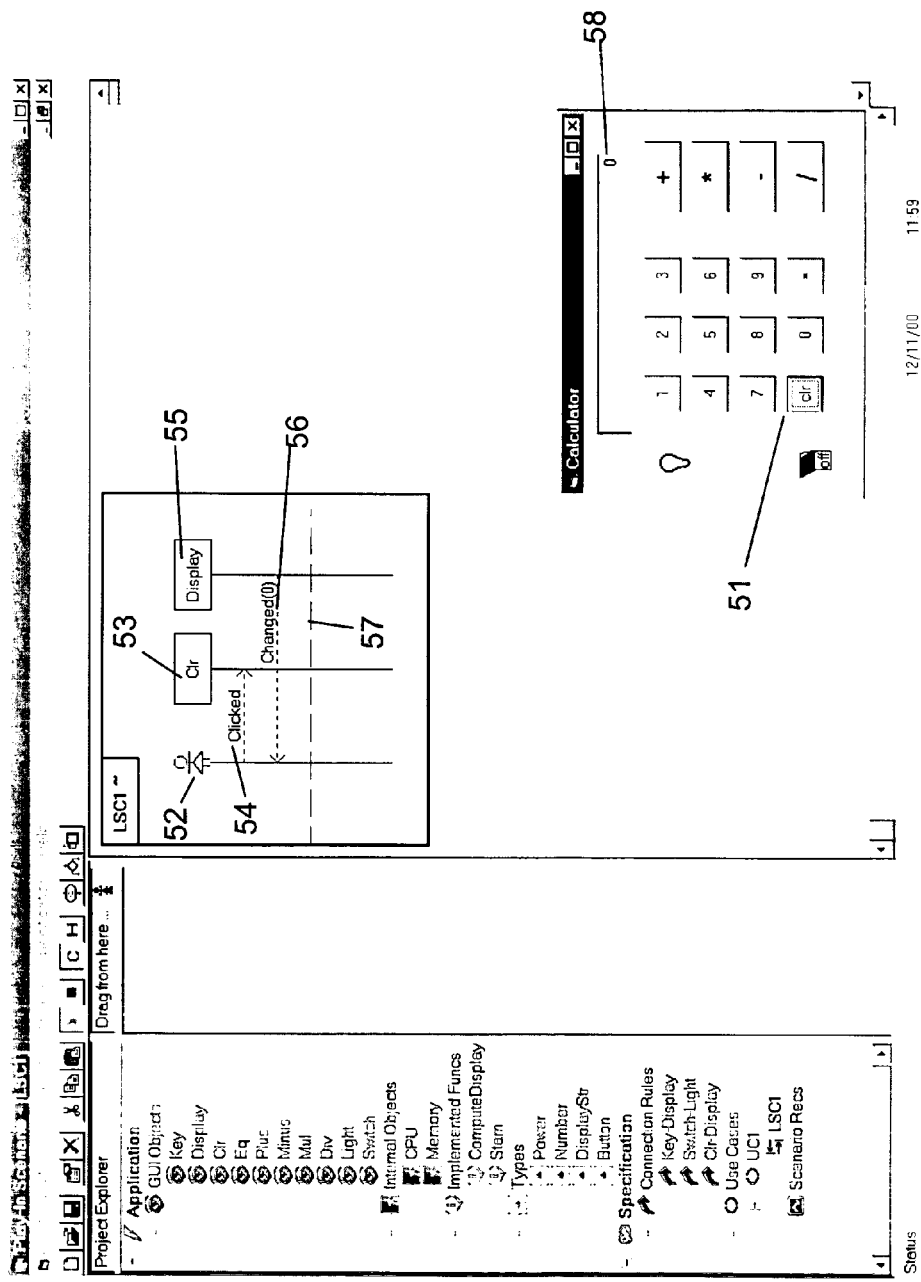
Figure 6:
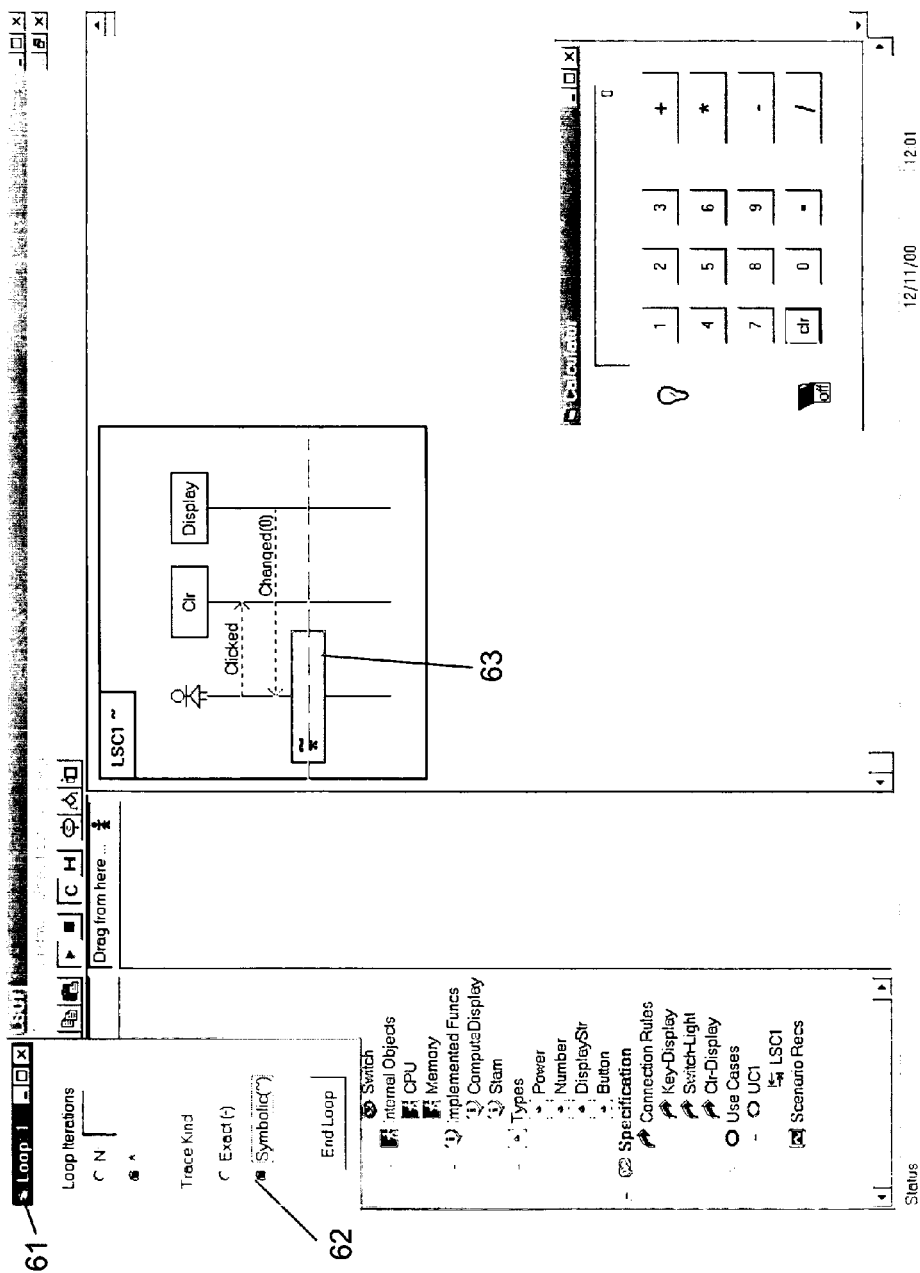
Figure 7:
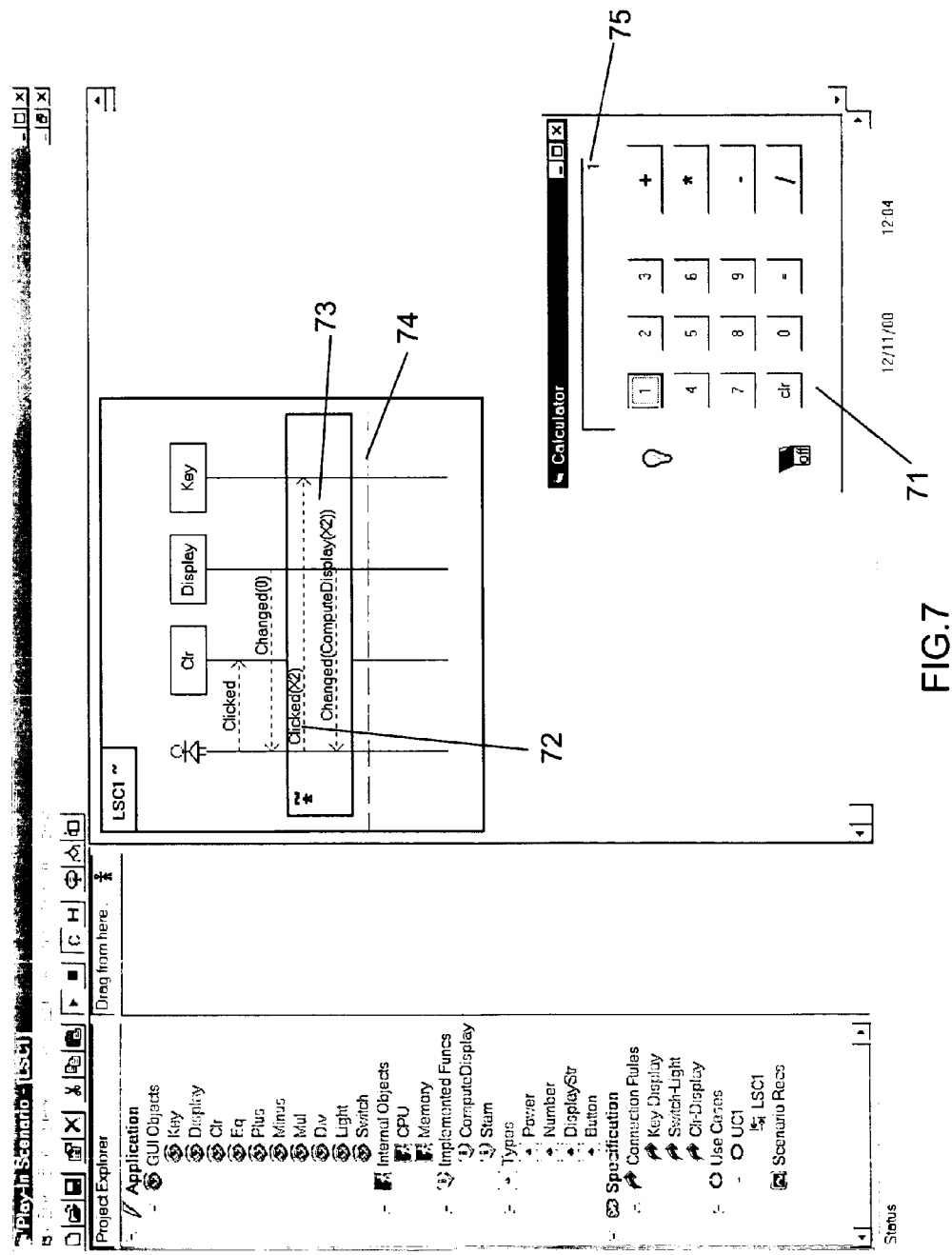

Here is explained the initial setting and the main elements involved in the specification process. The environment supplied by the Play-In Engine is shown in FIG. 4. Following is a description of each of the elements The Application Section (40)

This section contains the elements defined in the application. The Play-In Engine queries the application for this information and displays it in a tree format. This information contains:

The GUI objects defined in the application (e.g., Key, Display, Switch, etc.) (41)

The internal objects defined a priori in the application (in this case there are two, Memory and CPU) (42)

A list of functions implemented by the application. These functions are written by the designer to help the user specify more complicated behaviors (e.g., Compute-Display computes the value of the display after each number click by multiplying the value of the display by 10 and adding the key). (43)

The types upon which the objects in the application may be based (e.g., Power, Number, etc.) (43')

The Specification Section (44)

This section contains the elements specified by the user.

Connection Rules, used to help the user with connecting parts of the Play-in, thus alleviating the specification of several cases, such as specifying that every time the CLR key is pressed the Display should show 0. (45)

Use cases and LSCs. This part is the main one in the specification, and it consists of use cases defined by the user and the LSCs implementing them. (46)

Scenario Recordings. This part contains recordings of the user action only (47).

The GUI Application (48)

This GUI application (in this case, calculator) was created by the user.

The LSC Diagram (49)

This part contains the Live Sequence Charts that are constructed by the Play-In Engine during play-in and active charts during play out (as will be discussed in greater detail below). Notice that in FIG. 4 the LSC is empty.

Step 2: (described with reference to FIG. 5)

Designer Action

Operate the 'CLR' (51) button by clicking it on the calculator.

System Reaction

The Play-In Engine is notified about that event, adds the actor (52) and the CLR instances (53) to the LSC and connects them by an appropriate message (clicked (54)). The engine then seeks an applicable connection rule and finds that the rule Clr-Display dictates that whenever CLR is clicked, the display should change to 0 (see detailed discussion about the rules above). Note that this rule does not replace an explicit specification of the calculator behavior using LSCs, but is rather an assisting tool for the designer in routine and monotonic actions. The engine adds the Display instance (55) to the LSC and generates a message indicating that the display changes to 0 (56). The dashed horizontal line (57) is a graphical cursor indicating where the next message will be located. The engine calls the application which preferably should reflect the current state of the application. By this particular example, the display should show '0' (58) in response to clicking Clr.

Step 3: (described with reference to FIG. 6)

Designer Action

In this step, the designer wishes to specify that the user may click calculator keys several times, and the display should be updated accordingly. To achieve this, the designer clicks the 'Loop' button placed on the tool bar) and a "Loop Assistant" (61) opens up. Since the user is allowed to click any key in the keypad inside the loop and not a specific ("exact") key, the designer clicks the 'symbolic' option (62) in the loop assistant.

System Reaction

After clicking the 'Loop' button, the system opens the loop assistant and indicates graphically on the chart that a loop is being specified (63). Note that the cursor indicates that the following messages will be located inside the currently specified loop. The system indicates in the chart whether the loop is exact or symbolic and how many times the loop should run. In this case the loop is symbolic and the number of times is unbounded, denoted by*. Note that the latter specific example illustrates the capability to use control constructs as a part of operating objects to realize "do while", "if then else" statements etc. In response, appropriate LSC flow control constructs are constructed.

Step 4: (described with reference to FIG. 7)

Designer Action

The designer clicks one of the keys (0–9) (71) and then clicks the "End Loop" button in the loop assistant.

System Reaction

After clicking the key, the system adds a message indicating that the key was clicked (72). It, then looks for an applicable connection rule (see detailed discussion above) and finds that the rule Key-Display dictates that after a key is clicked, the display should be updated according to a designer supplied function named "ComputeDisplay". In an exact mode, what the engine would do is call the application to compute the value of the function applied to the key clicked. In the symbolic mode, the current value has no meaning and what the system shows is that the function should be applied to the key just clicked (indicated using an arbitrary symbol, in this case X2 (73)). After the designer clicks the "End Loop" button, the system removes the highlight from the loop and indicates (by appropriate line (74) that the next element will be outside the loop. As specified above, the application should visually reflect the state of the application and accordingly, assuming that the number '1' was clicked the play-in engine calls the application in order to display the digit '1' (75) and the appropriate message is added (73).

Step 5 (described with reference to FIG. 8)

Designer Action

The purpose of this step is to "capture" the display contents in a variable in order to utilize it for the calculator operation, say '+'. Thus, the contents of the display (i.e. the first number that is entered) will be captured and assigned to a first variable (say N1), and after the designer clicks the operator (say '+') the next number that will be entered will be assigned to a second variable (say N2) and the sum operation will be applied to N1 and N2.

Bearing this in mind, it is first required to assign the contents of the display (i.e. the first number that is entered) to N1. By this specific example this is realized by inserting a condition saying that the number being displayed is assigned to a variable, say N1. The designer clicks the 'Assertion' button (in the tool bar) and then clicks the display of the calculator. In response the condition form (83) is opened. Now the user clicks the display of the calculator. In response, a form (81) is opened, and the designer inputs "=N1" (82) (see "system reaction" below).

System Reaction

After clicking the 'Assertion' button, a condition form is opened and the engine waits for the designer to click on objects on which he/she would like to specify constraints. After the display is clicked, the engine opens a form where the user can specify the constraints. One can see that the type of the object clicked is displayed on the form.

Figure 9:
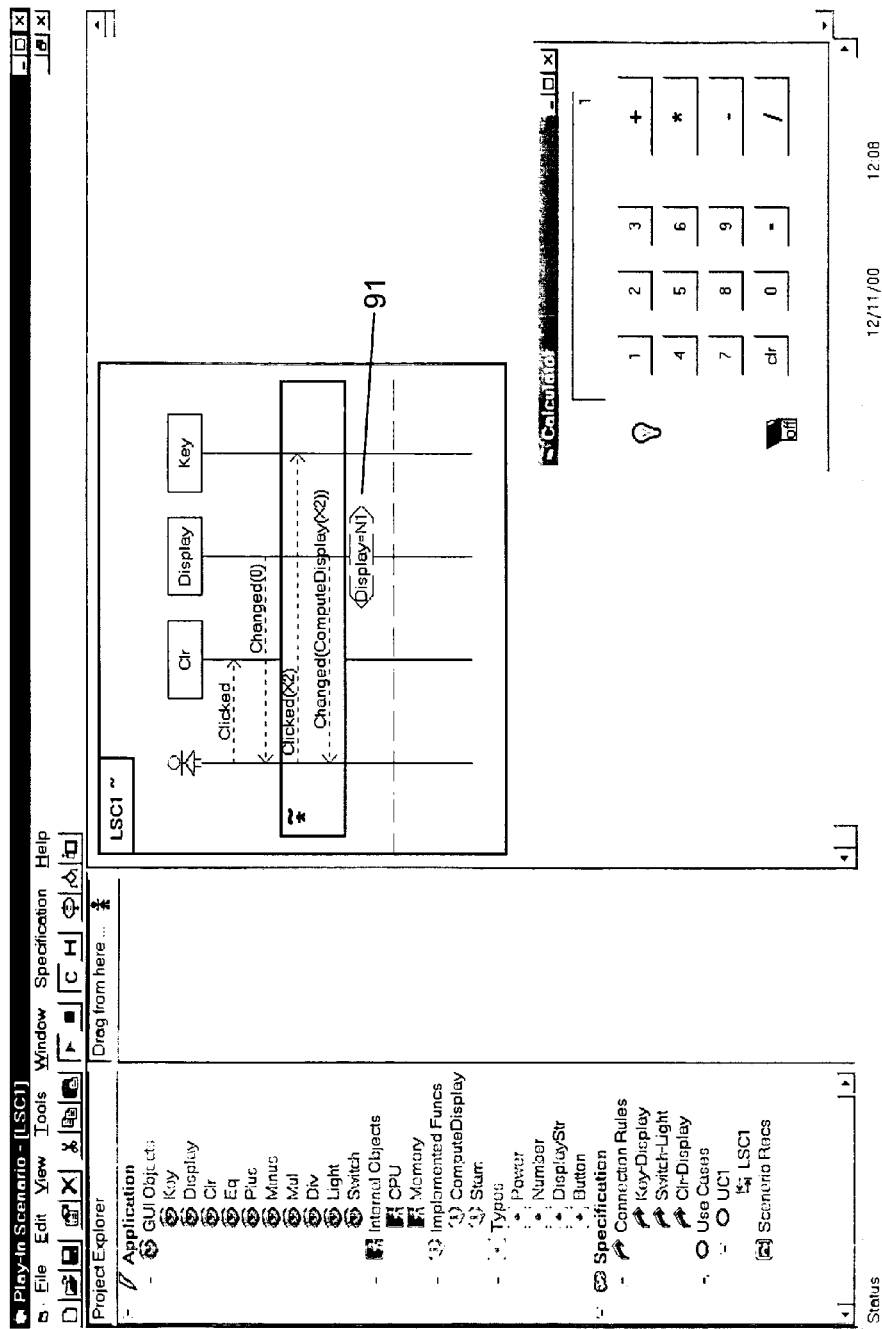
Figure 10:
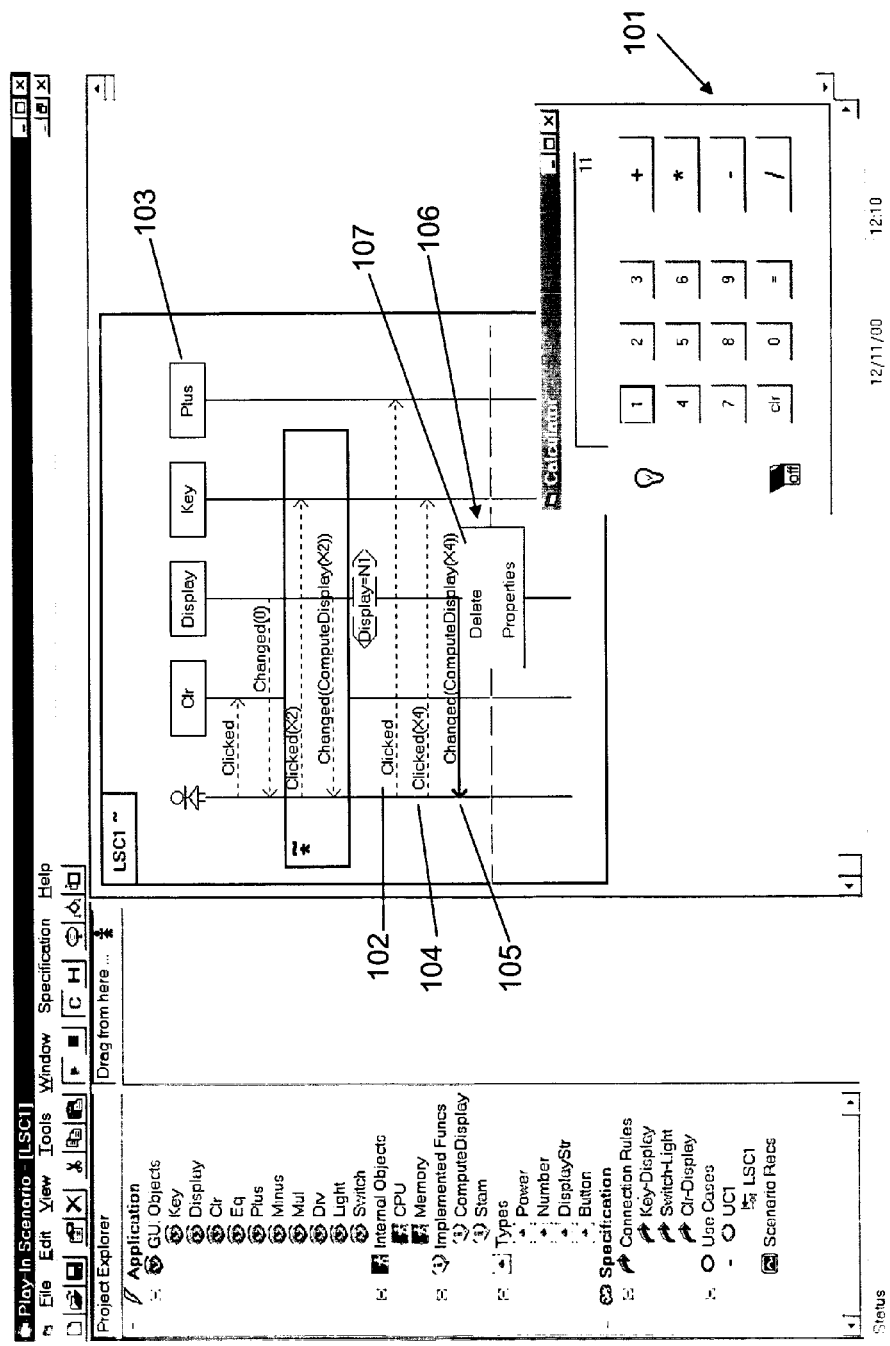

Step 6: described with reference to FIG. 9

Designer Action

Figure 8:
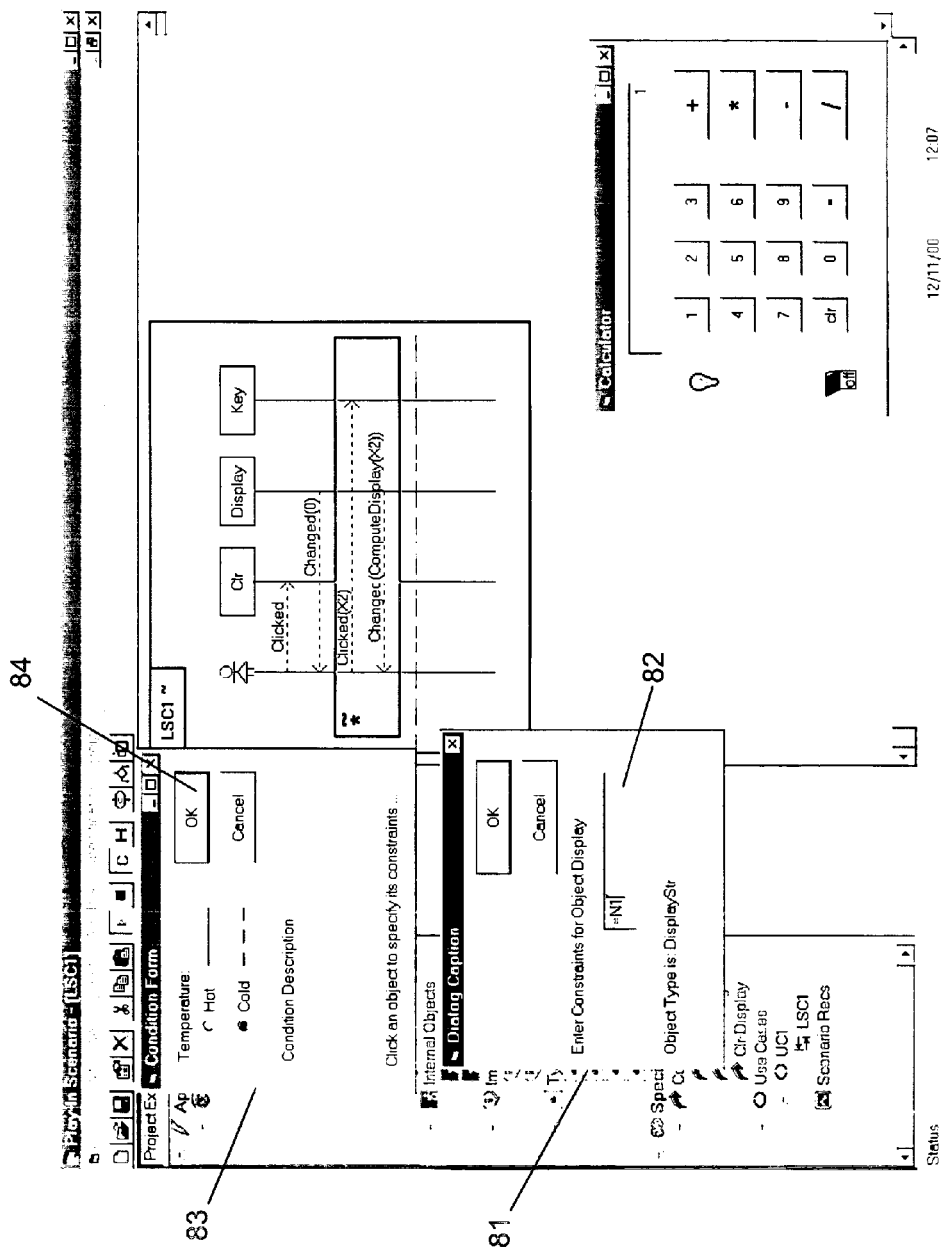

The designer clicks OK on the condition form (84 in FIG. 8).

System Reaction

The system creates a condition and displays it on the chart (91) according to LSC standards.

Step 7 (described with reference to FIG. 10):

Designer Action

The designer clicks the '+' button and then another key (0–9) (101).

System Reaction

The system adds the 'Plus' object to the LSC (103) and generates a new message indicating that the user clicked it (102). Had the implementation been as before, the display would have been updated using the automatic rule application after the user clicks the second key (0–9) (see message 104), i.e. the display would comply with the following rule "Second digit+First digit*10". The latter rule is reflected in message (105).

This behavior is, however, wrong, since the last digit is clicked after the "plus" sign and accordingly a different behavior is expected, i.e. that the first number would be erased and the last clicked digit would be displayed. The next few steps will remedy the faulty behavior as exhibited in message (105). As a first stage the latter automatically generated message must be deleted, and to this end the designer right-clicks the message and a pop-up menu (106) appears enabling the designer to choose the delete option (107) and to delete the message (105).

System Reaction

When the designer right-clicks an element (e.g., message, condition, sub-chart etc.), the system pops up the menu (106) that lets the designer examine the element's properties or delete it (107). After choosing the 'delete' option, the system deletes the element (and all sub elements if it is a sub-chart).

Step 8 (described with reference to FIG. 11)

Designer Action

As explained above, the designer wishes to specify that the display should show the value of the last key pressed (i.e. the "second" clicked digit referred to above). To this end, he/she operates the display of the calculator by clicking it.

System Reaction

The system knows (the designer specified it in the system description) that the display is an 'Out' object. Thus, after the designer clicks it, a form is opened (110) where a new value can be indicated.

Designer Action

Since the designer wants the value of the display to be the same as the one clicked, he/she chooses "Existing Variable" (111).

System Reaction

The system shows a symbol table (112) from which the designer picks X4 (113) which is the symbol that the LSC used to represent the key that was clicked.

Step 9: (described with reference to FIG. 11)

Designer Action

Figure 11:
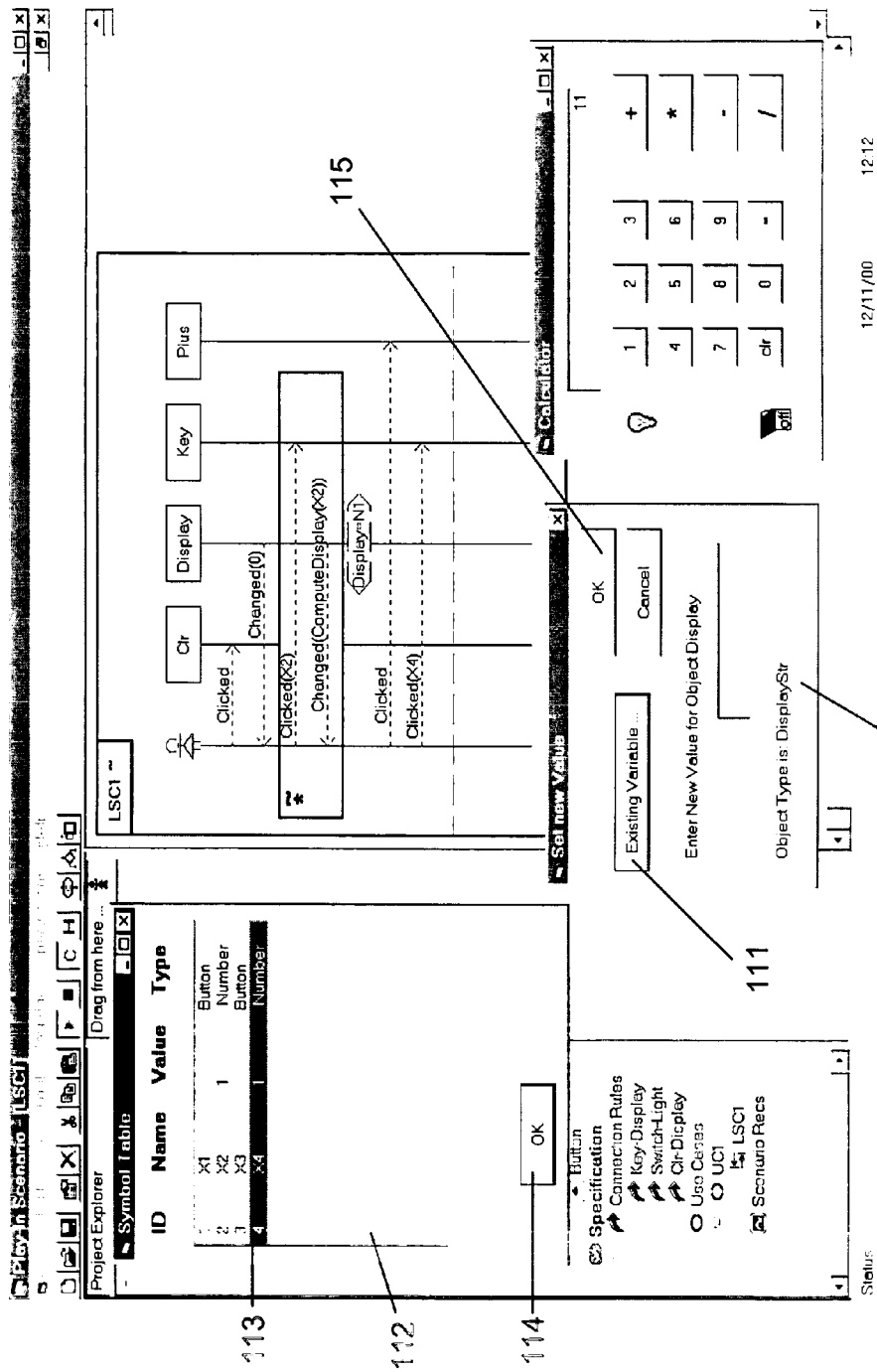

The designer clicks OK on the symbol table and then OK in the 'New Value' form (114 and 115 in FIG. 11).

System Reaction

Figure 12:
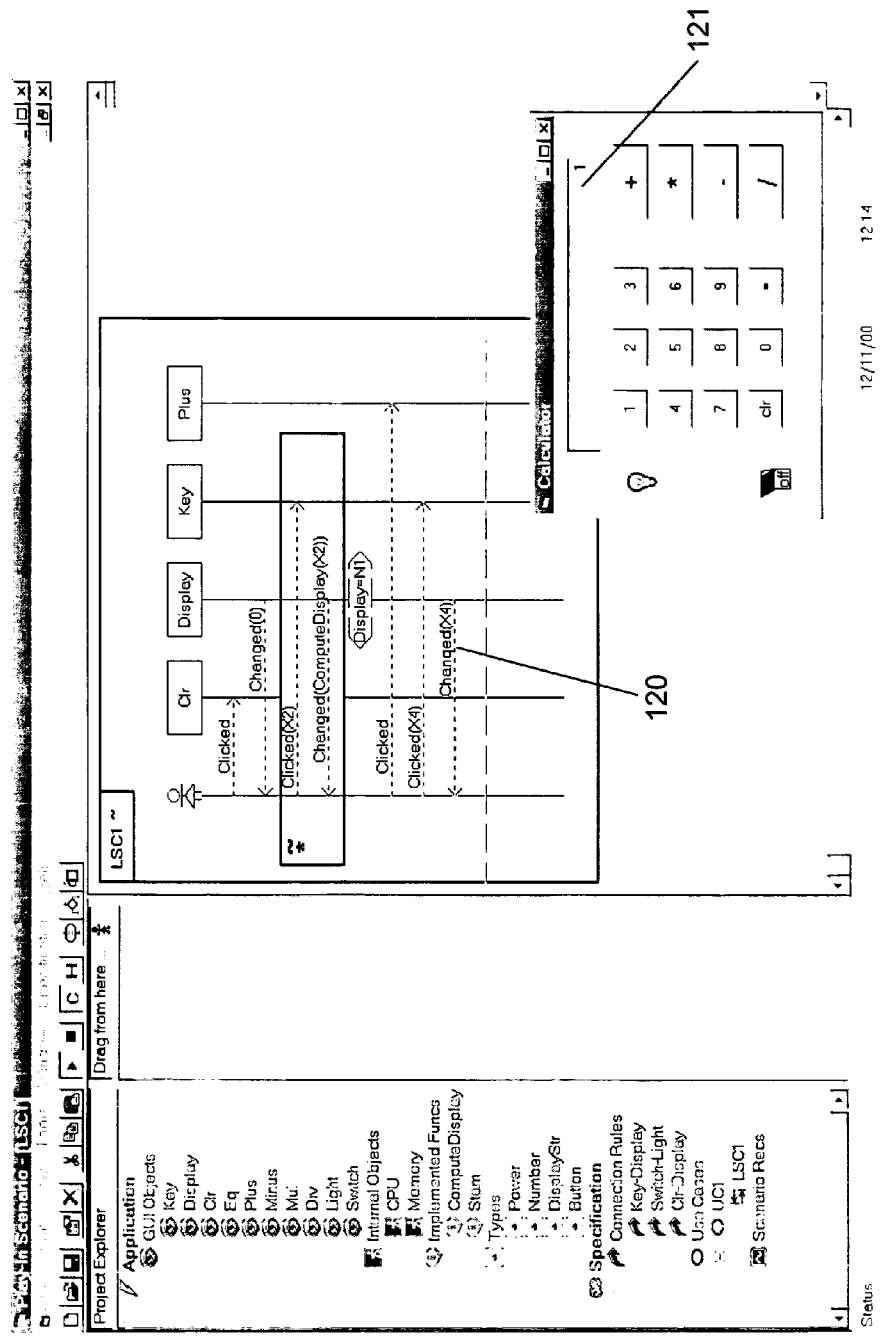

The system shows X4 in the 'New Value' form, and when the designer clicks OK on that form, the system generates a message indicating that the display should be changed to the value indicated in the previous message (120 in FIG. 12). Next, the play-in engine calls the application to visually reflect the state of the application, and more specifically to display the second clicked key '1' (121).

Figure 13:
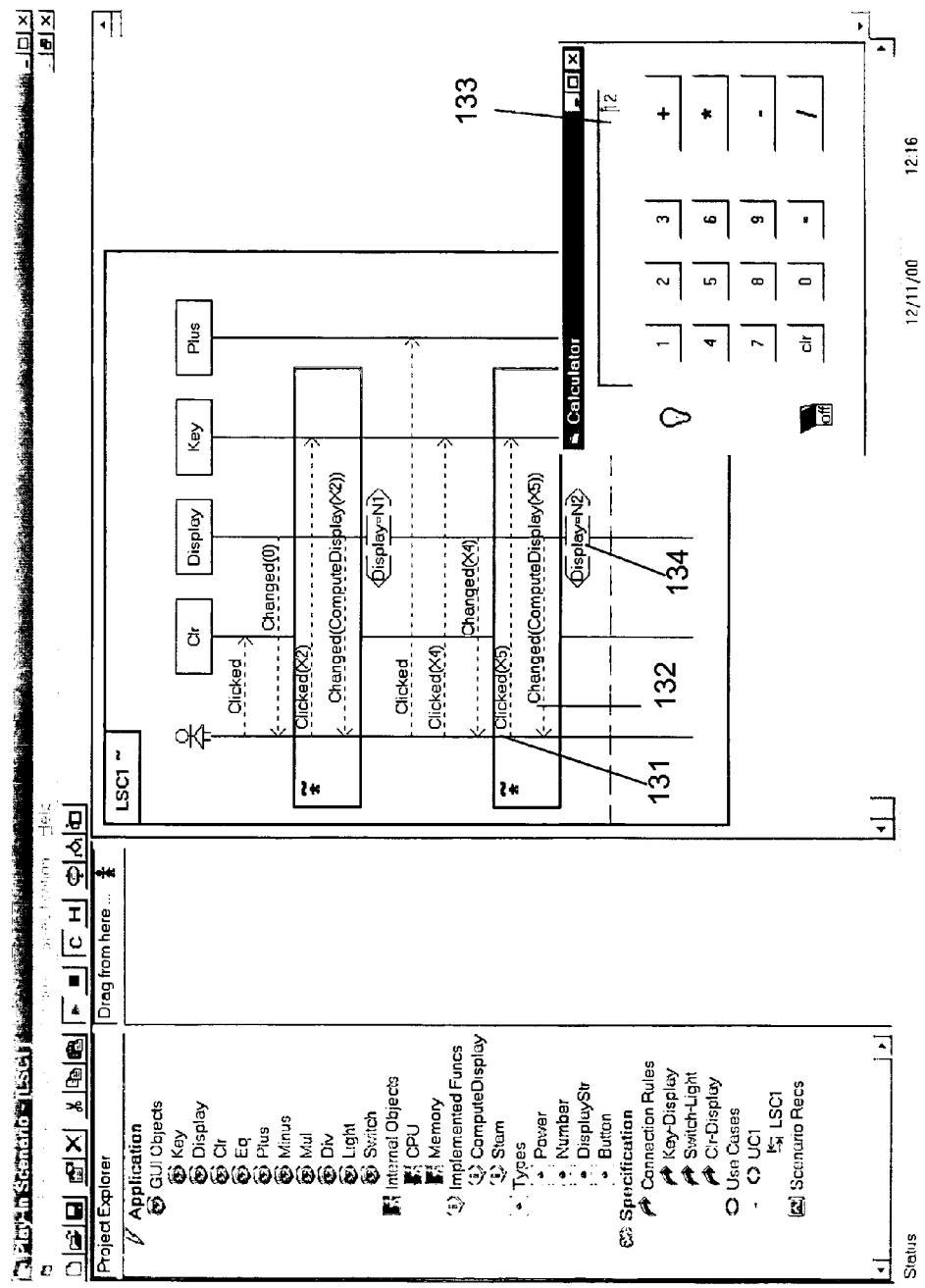

Step 10 (described with reference to FIG. 13)

Designer Action and System Reaction

Here, the designer uses another loop to specify that the user may now click several more keys. He/she then inserts a condition that the number displayed is to be equal to N2. The net effect is that a second number is keyed-in (in the example the second number is "12"—composed of first keying the '1' digit and then the '2' digit) and the appropriate messages (131) and (132) are inserted to the LSC chart. Then the display is updated to reflect the second number "12" (133). And lastly, the contents of the display (indicative of the second number) is stored in N2 (condition 134). It is recalled that the first number is already stored in N1. The specified sequence of operations is similar to that described in steps 3–6.

Figure 14:
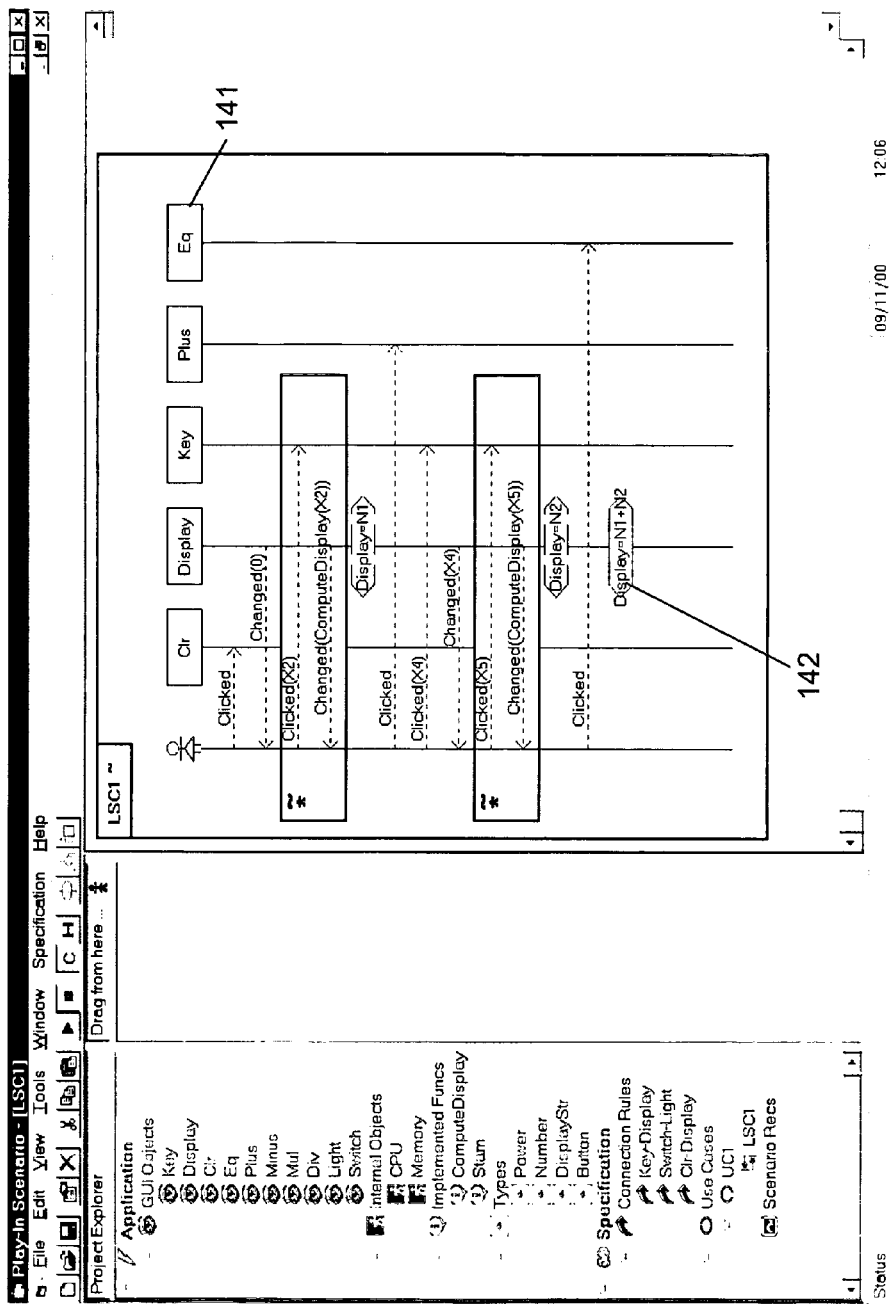

Step 11 (described with reference to FIG. 14)

Designer Action

The designer clicks the '=' button on the calculator (not shown) and then inserts a "hot" condition (through the tool bar—not shown) indicating that the display should show the sum of the two numbers. As is known, in the LSC a "hot" condition signifies that the condition must be met, i.e. the numbers must be summed. This ends the play-in scenario.

System Reaction

Same as described in earlier steps. The system lets the designer specify an element as hot through a dialog box, or alternatively, it lets the designer indicate that from some point and on all elements are hot (not shown). Temperatures can be changed after the fact by using the element property dialog. The Equal button object (141) is displayed and the hot condition Display=N1+N2 (142) is portrayed on the LSC chart.

Figure 15:
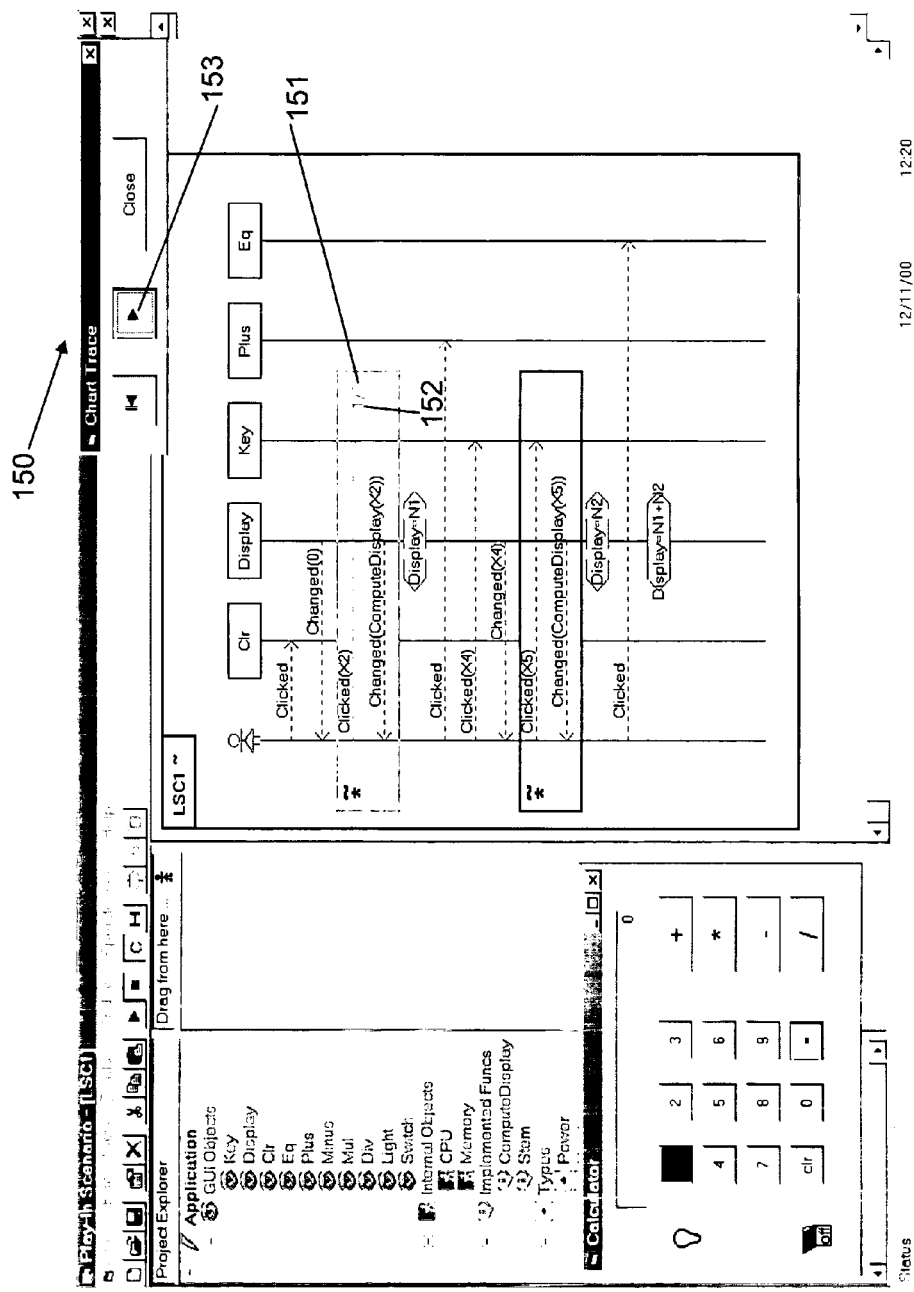

Tracing the Chart (described with reference to FIG. 15)

Designer Action

After specifying an LSC the designer may trace it. He/she does so by choosing 'Trace Chart' from the menu and then running the steps one by one. System Reaction. The system opens a "Trace Chart Player" (150). When the designer clicks the 'next' button (153), the engine highlights the relevant elements in the chart and the relevant objects in the GUI application. It also changes the values of objects in the GUI application as though a user was playing it. FIG. 15 also shows that additional information is given, such as the current sub-chart, how many iterations a loop should run and what iteration it is currently in. For example, FIG. 15 illustrates that currently the first loop (151) is executed (aimed at inserting the first number) and that it has three iterations (i.e. three digits are keyed-in) and that the current state is the first out-of these three iterations (i.e. the first digit is clicked 152). It should be noted that in the trace mode the number of iterations (by this example 3) in the loop is a priori fed to the system.

Those versed in the art will readily appreciate that the invention is not bound by the specific example above nor by the specific manner of its implementation. Thus, for example, other application GUI and/or LSC than those depicted in FIGS. 4 to 15 may be used. In fact, another non-limiting example that generates another variant of LSC is given below.

Note also that the break down to the steps in the manner described above is not binding. The utilization of rules is one out of many possible variants that can be used. If desired, for convenience drag-and-drop operations may be used. These are only examples and other modifications may be applied, all as required and appropriate depending upon the particular application.

The example of calculator has concentrated on specifying the interaction between the user and the system, and therefore emphasized the operations of GUI objects.

Here is a brief description of how interaction with internal objects such as e.g. memory and CPU may be handled.

Consider the following non-limiting example. Suppose that the designer wishes to specify that after the '+' key was clicked, the number N1 is sent from the Display to some internal object, say the CPU. The designer may be provided with a graphical layout of the computer motherboard (containing only the elements essential to the specification). Using this layout, the user clicks the Display object on the calculator and drags an arrow from the display object to the CPU box object on the motherboard layout map. When doing so, the play-in engine will open a menu containing all the messages (in this case, methods) that the CPU can handle. The designer then chooses one of these methods (e.g., "Store Number"). By this specific example the operation of the object signifies interaction between the display object and the CPU object where the contents of the display is stored in the CPU memory.

The engine would then add a message, in the LSC, from the Display to the CPU, with the label "Store Number (N1)". In this way, the user may continue specifying the reaction between GUI objects and internal objects and between internal objects and themselves.

In case no graphical layout is provided to the user (or created by him), the user may simply specify two dimensional coordinates for each internal object, and the Play-In Engine will construct an "Object Map" (being one form of the system GUI) to serve as a simple graphical layout for that purpose. Object map is of course a non-binding example.

As specified above, the invention is not bound by either a specific system behavior specification or by the particular LSC embodiment. Bearing this in mind, there follows a brief description of a modified and more advanced LSC embodiment and another example that utilizes this modified LSC.

Note that also by this embodiment, the LSC has two types of charts: universal (annotated by a solid borderline) and existential (annotated by a dashed borderline). Universal charts are used to specify restrictions over all possible system runs. A universal chart is typically associated with a prechart that specifies the scenario which, if successfully executed, forces the system to satisfy the scenario given in the actual chart body. Existential charts are used in LSCs to specify sample interactions between the system and its environment. Existential charts must be satisfied by at least one system run. They thus do not force the application to behave in a certain way in all cases, but rather state that there is at least one set of circumstances under which a certain behavior occurs. Existential charts can be used to specify system tests, or simply to illustrate longer (non-restricting) scenarios that provide a broader picture of the behavioral possibilities to which the system gives rise.

Figure 16:
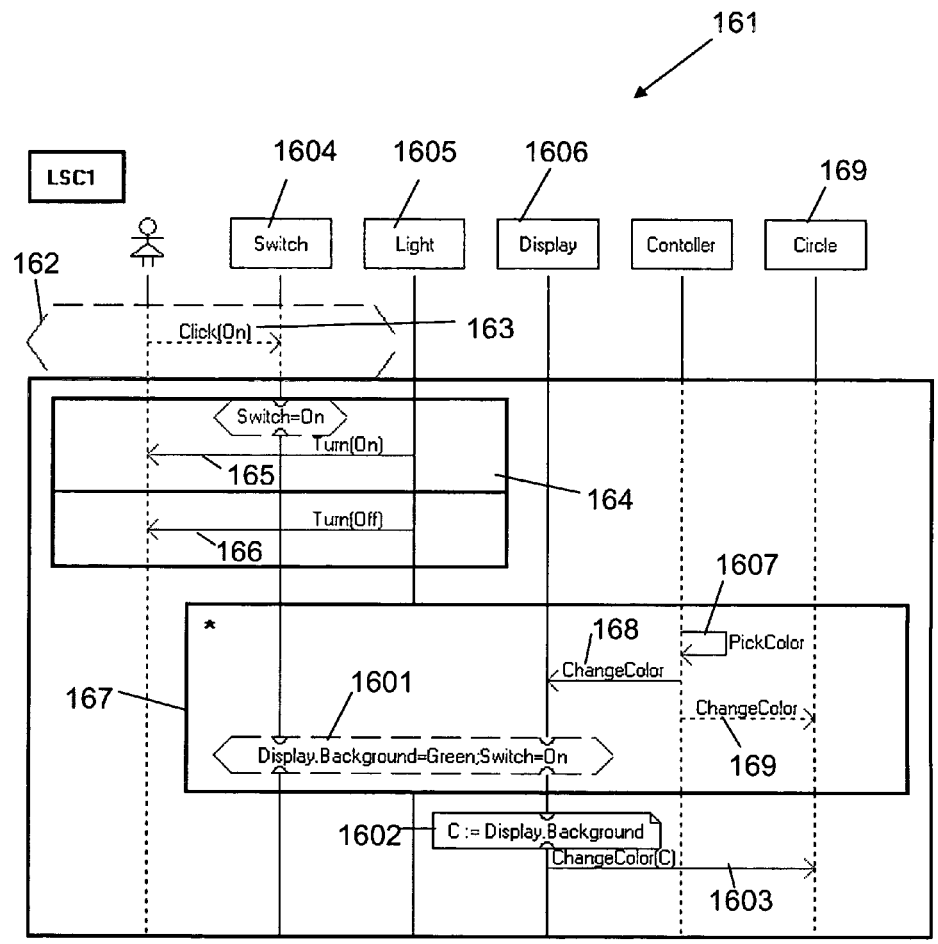
FIG. 16 illustrates an exemplary modified Life Sequence Chart (LSC)

Turning now to FIG. 16, the LSC (161) includes a prechart (top dashed hexagon 162) that contains a single message denoting the event of the user clicking the switch to be on (163). Following this, in the chart body, there is an if-then-else construct (164): if the switch's state is on, then the light goes on (165), otherwise, it goes off(166). After the if-then-else comes a loop construct (167). There are three types of such constructs; this one is an unbounded loop, denoted by a '*', which means that it is performed an a priori unknown number of times. It can be exited when a cold condition inside it is violated, as will be described below. There are also fixed loops, annotated by a number or a variable name and performed a fixed known number of times, and dynamic loops, annotated with a '?' and for which the user determines the number of iterations at run time. Inside the loop of FIG. 16, the controller picks a color (1607) (say, at random) and sends it to the display object (168) and to the circle object (169). The message to the display is hot, denoted by a solid line, while the message to the circle is cold, denoted by a dashed line. The semantics is that if a hot message is sent it must be received, whereas a cold message may be lost and never received.

The loop ends with a cold condition (1601) that requires the background color of the display to be green and the state of the switch to be on. If a cold condition is true, the chart progresses to the location that immediately follows the condition (i.e. in this case, since the loop is unbound, the next location is the beginning of the loop) whereas if it is false, the surrounding (sub) chart is exited. A hot condition, on the other hand, must always be met, otherwise the requirements are violated and the system aborts. Note that placing a cold condition C at the beginning or end of an unbounded loop creates while C do and repeat until—C constructs. By this embodiment, conjunctive-query conditions are supported, namely ones that are conjunctions of primitive equalities or inequalities. In FIG. 16, the controller will continue picking colors until a color other than green is chosen, or the switch is turned off.

After the loop comes an assignment element (1602). Assignments are internal to a chart and were not supported in the previous embodiment of LSC discussed above with reference to FIGS. 4–15. Using an assignment the user may save values of the properties of objects, or of functions applied to variables holding such values. The assigned-to variable stores the value for later use in the LSC. The expression on the right hand side contains either a reference to a property of some object (this is the typical usage) or a function applied to some predefined variables. Note that the assignment's variable is local to the containing chart and can be used for the specification of that chart only, as opposed to the system's state variables, which may be used in several charts. Each assignment may have several participating objects, which, as in conditions, synchronize at the location of the assignment. Synchronizing at an assignment (condition) means that none of the synchronized instances may progress beyond the assignment (or condition) until all of them reach it and it is actually performed (or evaluated). In the assignment shown in FIG. 16, the background color of the display is stored in the variable C (1602).

Following this assignment, the display sends the stored color to the circle object (1603), this time using a hot message. Here also, the LSC was extended by enabling messages to be exact, (as in the original definition of LSC [3]), or symbolic. A symbolic message uses variables whose values may vary in different runs.

The switch, light and display objects (1604 to 1606, respectively) all consist of hot locations (denoted by solid instance lines), thus forcing their progress, while the circle and controller have cold locations (denoted by dashed instance lines), meaning that they need not progress, and may stay at a location forever without violating the chart.

The example of a pocket calculator will now be illustrated with reference to the specified modified LSC and FIGS. 17 to 24 At the onset, the user specifies what happens when the calculator is turned on. Since this is done using a switch, the action of clicking the switch is placed in the prechart (171), and the appropriate system reactions are placed in the chart body (172)

By this embodiment, the desired response of the system is to turn on the light, to turn on the display, to display a 0 and to change the display's color to green.

The process of specifying this behavior is very simple. First, the user clicks the switch on the GUI, thus changing its state from off to on. When the play-engine is notified of this event, it adds the appropriate message in the (initially empty) prechart of the LSC from the user instance to the switch instance (171).

Figure 17:
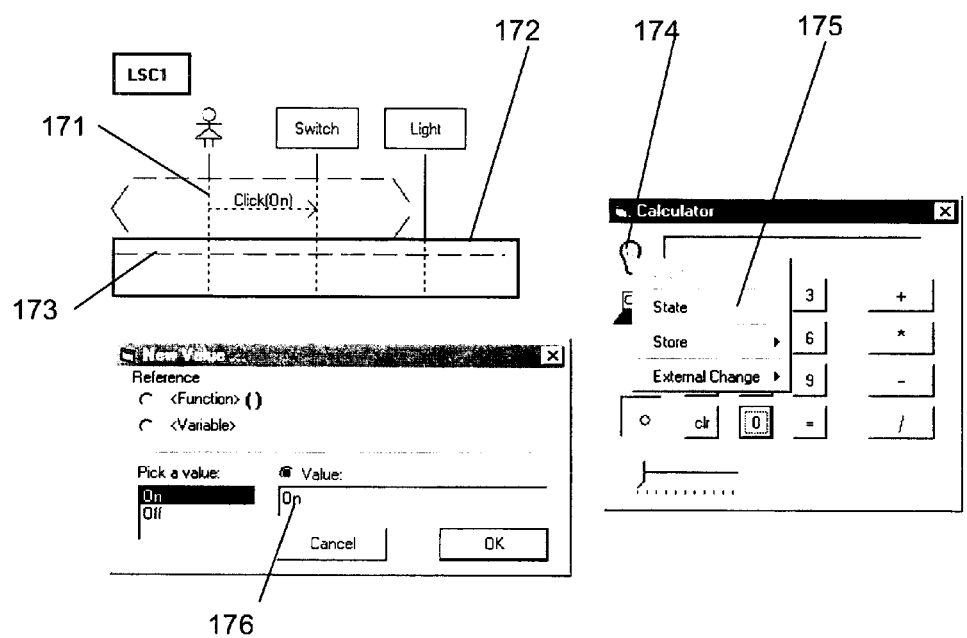
FIGS. 17 to 24 show eight consecutive screen layouts illustrating an exemplary playing-in calculator application, in accordance with another embodiment of the invention.
Figure 18:
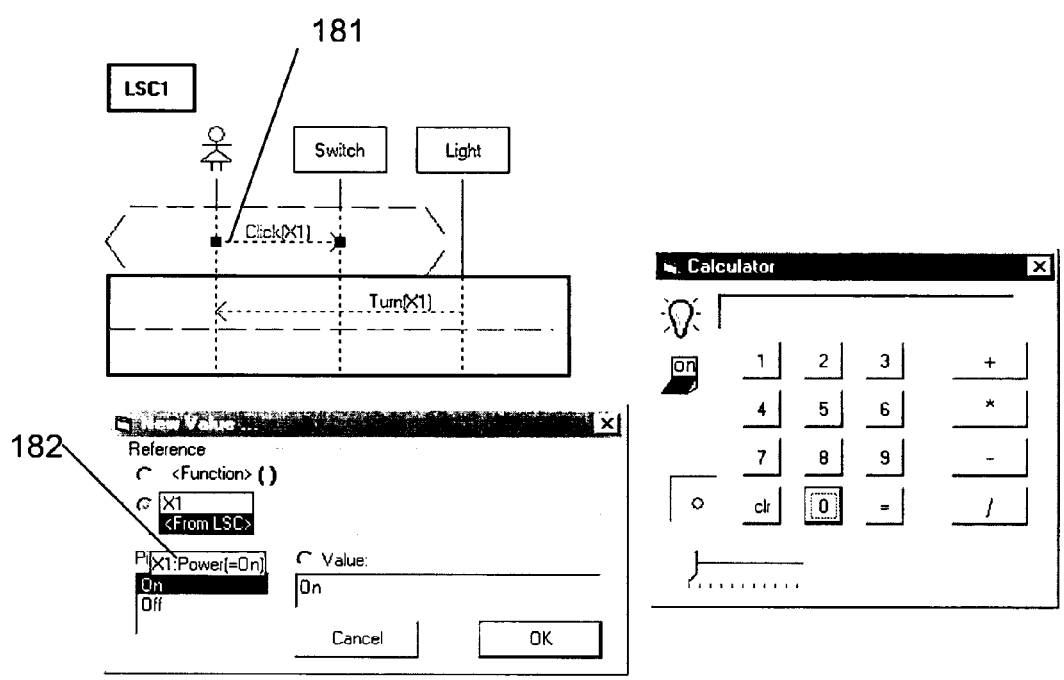

Now the user wishes to specify the sequence of system reactions to his/her action, beginning with the change in the state of the light. To do that, the user moves the cursor (designated as dashed line (173)) into the chart body and right-clicks the light on the GUI (174). The engine knows the properties of the light (in this case, there is just one) and pops a menu, from which the user chooses the State property (175) and sets it to on (176). FIG. 17 shows the situation after the switch is clicked and just before the state of the light is set to on. Similar processes are then carried out for the state and background properties of the display. After each of these actions, the engine adds a message in the LSC from the instance representing the selected object to the user instance, showing the change in the property. The play-engine also sends a message to the GUI application, telling it to change the object's property in the GUI itself so that it reflects the correct value after the actions were taken. Thus, when this stage is finished, the GUI shows the switch on, the light on, and the display colored green and displaying 0 (not shown). Suppose now that the user wishes to specify what happens when the switch is turned off. In this case the light and display should turn off and the display should change its color to white and erase any displayed characters. The user may of course play in another scenario for this, but these two scenarios will be very similar, and they are better represented in a single LSC. This can be done using a so-called symbolic message. The scenario is played-in as before, with the switch being clicked as part of the prechart, and the system's reactions being played-in as the charts body. However, this time a symbolic flag is set to on. When in symbolic mode, the values shown in message's labels are the names of variables (or functions) rather than actual values. So the user will now indicate that the light should turn on or off as a result of the prechart, but that it should take on the same state as the switch did in the prechart. The play-engine provides a number of ways to achieve this. For example, a variable can be selected from a table of defined variables, or, as shown in FIG. 18, the user can indicate that the value should be the same as in some message in the LSC. If the second option is taken, the user simply clicks the desired message inside the LSC (181) and its variable (X1) will be attached to the new message as well. Note that after clicking the message, the selected variable with its type and value are shown to the user (182) as a tool tip. In case the selected message is associated with a function that has more than one variable, a dialog pops up, showing the function with its actual parameters, and the user can then click any one of these parameters, to be attached to the newly created message (not shown).

Figure 19:
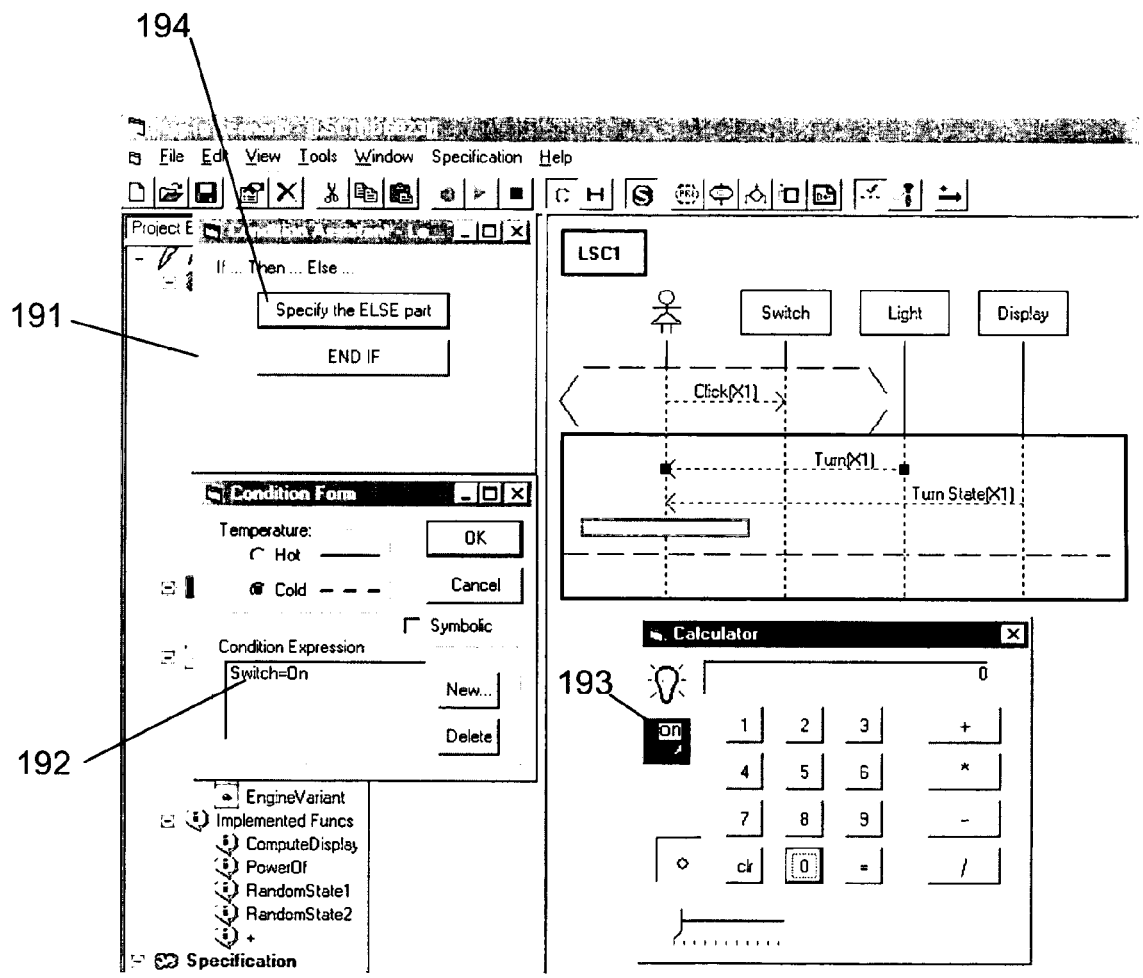

Having dealt with the turning light on or off features, the display's color will now be handled. In one case it should become green and in the other white. To this end, an if-then-else construct can be used. The user clicks the If-Then button on the toolbar and in response a wizard and a condition form are opened. Conditions can be specified conveniently via the GUI, as when operating objects or specifying system reactions, except that here several kinds of relation operators can be used (e.g., <, <=, >, etc.). FIG. 19 shows the system after the wizard (191) opens and the user clicks the switch on the GUI. Note that in the condition form, the value of the switch is specified (192), and the switch itself is highlighted in the GUI (193). Conditions may refer to properties of GUI objects, to values of variables, or even contain free expressions that the user will be requested to instantiate during play-out (discussed later).

After the If-Then condition is specified, the user continues playing in the behavior of the If part in the usual way. When this is completed, he/she clicks the Specify the ELSE part (194) on the wizard and plays in the behavior for the Else part. The resulting LSC is (200) shown in FIG. 20. Similar assistance is provided by the play-engine for specifying the various kinds of loops.

Sometimes it is desired to use data manipulation algorithms and functions, that are applied to specified variables. These functions are usually be described using LSC-style interactions between objects but rather as external pieces of computation or logic to be worked into the requirements. Accordingly, there is described and shown a procedure for summing two numbers, which will illustrate how the play-engine supports such implemented functions. Since in the calculator example the process of entering numbers and displaying them on the screen is common to many scenarios, it is handled in a separate chart. Therefore, what is shown now deals only with the sum operation itself, assuming that entering the numbers has been specified separately.

Figure 21:
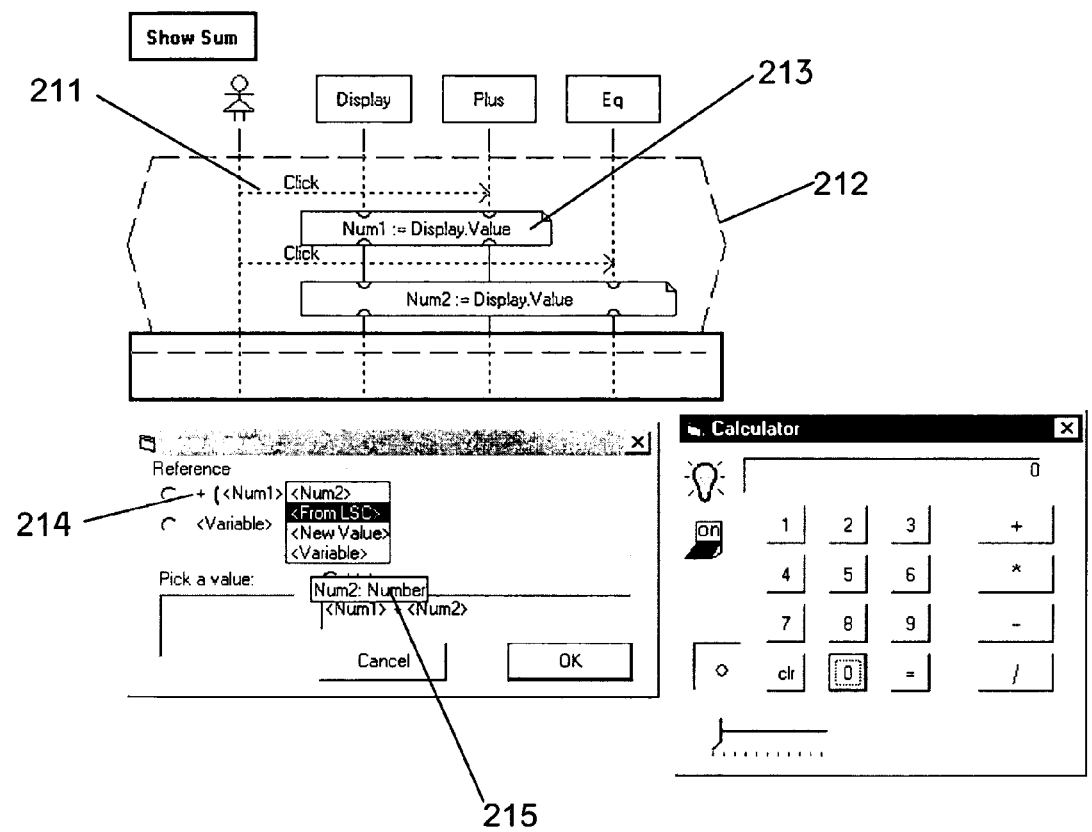

Turning now to FIG. 21, in order to specify the prechart (212) the user first clicks the '+' button on the GUI (211). It is now desired to store the value of the display. This is done by right-clicking the GUI's display, choosing Store and then Value from the popup menu (not sown), which will result in an appropriate assignment statement in the LSC (213). Since after storing a value it may be required to refer to it later, and to this end a meaningful name is helpful, the play-engine lets the user name the assigned variable, and by this particular example Num1. Note that even though the assignment refers only to the display, the Plus object can be seen in the figure to also be synchronized with it. This forces the assignment to be carried out only after the '+' was clicked, (otherwise, there is no partial order restriction to prevent the assignment from being performed immediately upon activation of the chart). The same actions repeat with the '=' button clicked and the display's value stored in Num2. The resulting LSC prechart (212) is shown in FIG. 21.

Figure 22:
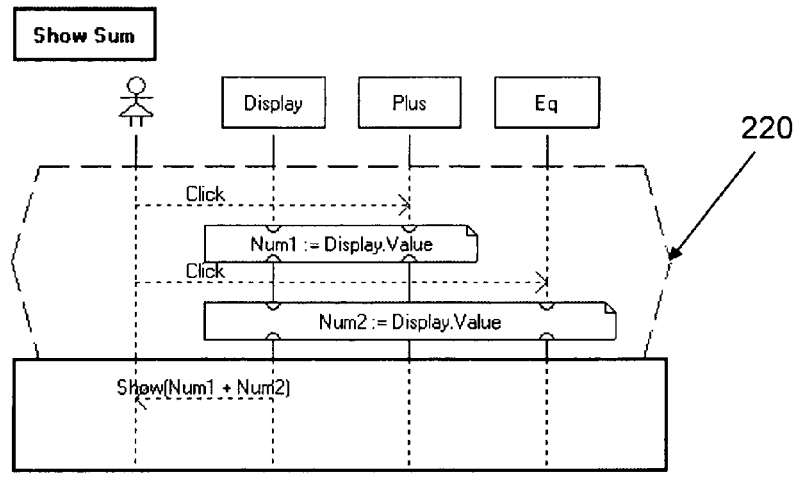

After the prechart is specified, the user wants to specify that the display should show the value of Num1+Num2. The user right-clicks the GUI's display and chooses the Value property from the popup menu (not shown). Now, instead of entering a fixed value or choosing an existing variable, the user clicks the Function button (which in FIG. 21 happens to be hidden by the selected function), and a list of implemented functions pops up. He/she selects one of them, and proceeds to substitute each of its formal parameters with a fixed value or a variable from the LSC. FIG. 21 shows that the '+' function has two parameters (214), and that the one currently pointed at is of type "Number" (215). FIG. 22 shows the final LSC (220) for summation.

Often, a reactive system works in the presence of not only a user interacting with it but also other elements that may interact with it (other machines, computers, sensors etc.). The set of all these elements is referred to as the system s environment. When playing in the required behavior of a reactive system, it is necessary to be able to express its reactions with its environment. The play-engine allows the designer to specify how the environment reacts with the system at hand in an intuitive way, which is very similar to the way, the interaction with the user is played in. Note that, similar to the user, the system environment (does not form part of the system GUI. However, the system GUI is used to reflect the effect of the environment on the system itself.

In order to specify a change in one of the properties of some object, by the environment, the object is right-clicked, and the designer chooses: External Change ((231) in FIG. 23). Then, from the sub-menu, the designer chooses the property to be changed. The property value is then inserted in the same way as it would have been for any other change.

The play-engine, then inserts a special instance (232), representing the environment and an appropriate message going from it to the target object.

Figure 23:
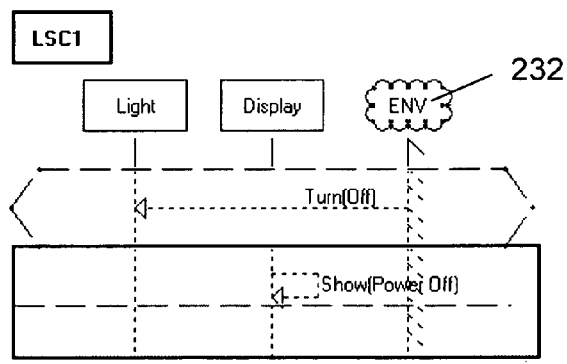
Figure 23:
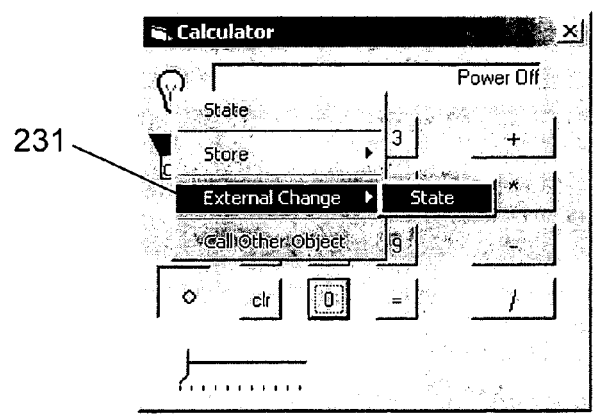

FIG. 23 shows the menu (231) opened when specifying an external (environment) change in the state of the light. The chart as a whole specifies that whenever the light is turned off by some external environment (not the user), the display should show "Power Off".

After playing in the requirements using the GUI application, the play-engine lets the user play in the behavior of internal objects and the way they interact with GUI objects and with each other.

Adding this information to the charts fills the gap between what the system should do and how it is done.

The play-engine provides means for adding internal objects on the fly. It also enables adding properties and methods to the new objects and also to the objects exported by the GUI application. The user may specify method calls between these objects by right-clicking the calling object and selecting Call Other Object (241). Then, the target object is right-clicked and the appropriate method is selected. Finally, the user instantiates the method's formal parameters with actual ones.

Figure 24:
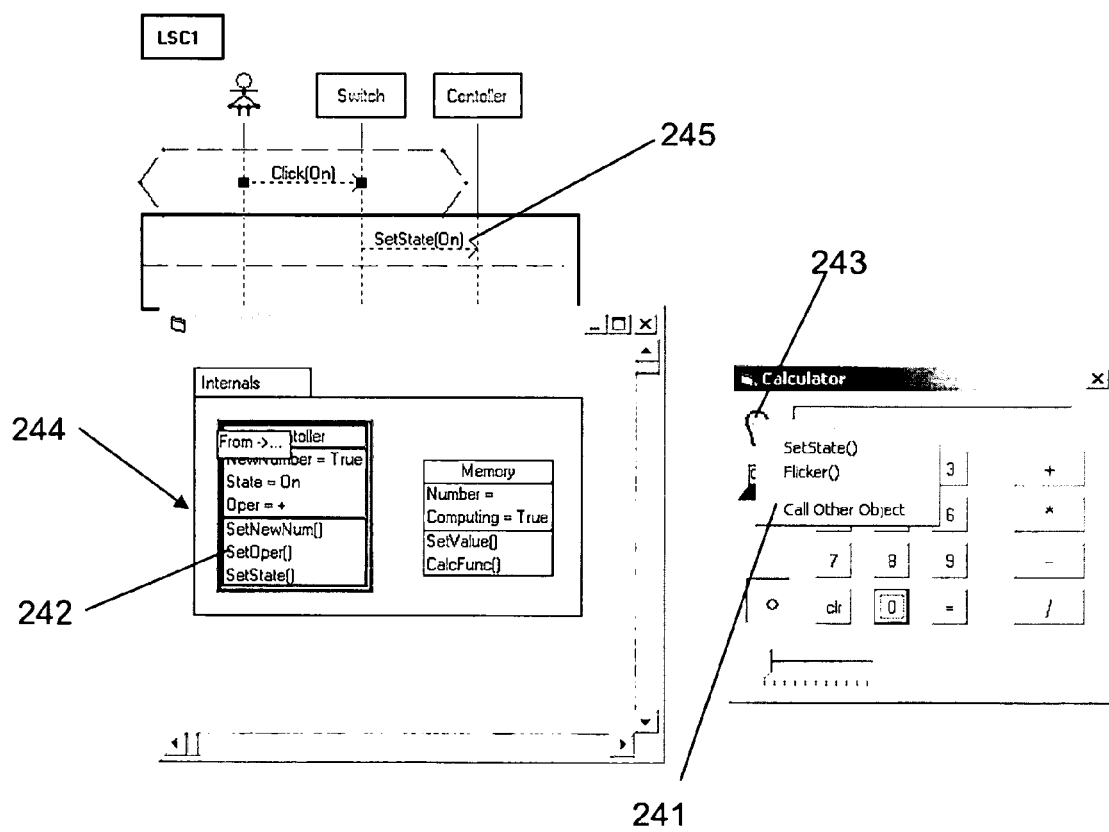

FIG. 24 shows a snapshot of the play-engine while a user plays in the interaction between an internal object (the controller (242) in this case) and a GUI object (the light 243), right after the controller was set as the calling object and before the appropriate method of the light is selected. The internal object is operated from within an "Object Map" (244) which is kind of an object model diagram, making the work with internal objects more intuitive. The LSC in FIG. 24 shows that previously, a similar interaction (245) was specified, this time from the switch to the controller.

Note that the invention is by no means bound by the modified LSC and/or the application discussed with reference to FIGS. 16 to 24.

Turning now to the play-out aspect of the invention, it is a process of testing the behavior of the system (as defined by the system behavior specification, e.g. LSC) by providing user actions in any order and checking the system's ongoing responses. Note that for convenience of explanation only, the play-out aspect of the invention is described with reference to modified LSCs (in short LSCs), discussed with reference to FIGS. 16 to 24.

The play-out process calls for the play-out-engine to monitor the applicable precharts of all universal charts, and if successfully completed to then execute their bodies. As discussed earlier, the universal charts contain the system's required reactions to other actions. By executing the events in these charts and causing the GUI application and object map (forming part of an example of system GUI) to reflect the effect of these events on the system objects, the user is provided with a simulation of an executable application.

As specified above, those versed in the art will readily appreciate that the play-out option does not necessarily imply activation of the play-in aspect of the invention. Put differently, the play-out option can be applied to a system behavior specification that is not necessarily generated by applying the play-in option of the invention.

Note that in order to play out scenarios, the user does not need to know anything about LSCs or even about the use cases and requirements entered so far. All he/she has to do is to operate the GUI application as if it were a final system and check whether it reacts according to his/her expectations.

Accordingly, one of the advantages of the play-out mode of operation is that the user plays out scenarios and actually tests the behavior of the specified system directly from the requirements—scenarios and forbidden scenarios as well as other constraints—without the need to prepare statecharts, to actually realize the scenario or possibly the whole system. Realizing includes: one or more of the following: writing code, generating code, provide any other detailed intra-object behavioral specification, etc. This process is simple enough for many kinds of end-users and domain experts, and can greatly increase the chance of finding errors early on. In accordance with one embodiment if the specification is large and the user wishes to focus only on certain aspects of the system behavior, he/she may specify which parts of the system behavior specification (e.g. which universal charts) will participate in the play-out process. The play-out is therefore useful for many applications including but not limited construction of prototypes, tutorials. In lieu or in addition it can actually implementation of a system.

Notwithstanding the above advantage, in accordance with a modified embodiment, selected parts of the system are provided in the form of one or more of statecharts, code, or detailed intra-object behavioral specification and others are provided in the form of system behavior specification, all as required and appropriate.

By one embodiment, the play-engine can react to user and environment actions in two modes: step and super-step. When in step mode, the user is prompted before every event (e.g. sending and/or receiving message), every condition evaluation etc. The next event to be carried out is marked on all relevant charts. In the super-step mode, the play-engine carries out as many events as possible, until reaching a "stable" state in which the system can do nothing but wait for some input from the user.

For a better understanding of the play-out sequence of operation, attention is directed to FIGS. 25 showing consecutive screen layouts illustrating an exemplary partial play-out calculator application, in accordance with one embodiment of the invention;

FIG. 25 contains a calculator GUI application (25A), an object map (25B) with two internal objects (controller and memory, 251 and 252, respectively) and three LSCs 25C–25E. It shows a snapshot of the play-out process just after the user has turned the calculator on and has clicked in the sequence 3,4,5,+,1,2.

By one embodiment, during play-out, charts are opened whenever they are activated and are closed when they are violated or when they terminate. Each displayed chart shows a "cut" (a kind of rectilinear "slice", e.g. 253 in FIG. 25C), denoting the current location of each instance. Optionally, when in Step mode the currently executed event is highlighted in the relevant LSCs (not shown). The play-engine continuously interacts with the GUI application and the object map (forming part by this embodiment a system GUI), causing them to reflect the changes prescribed by the executed events. As this is happening, in accordance with one embodiment the user may examine values of assignments, conditions and message variables by moving the mouse over them in the chart (259). Whenever relevant, the effects show up in the GUI.Note that the specified characteristics may vary, depending upon the particular application and/or other characteristics may be added, all as required and appropriate. For example, the specified stipulation when to open or close chart is not necessarily binding.

Figure 25A:
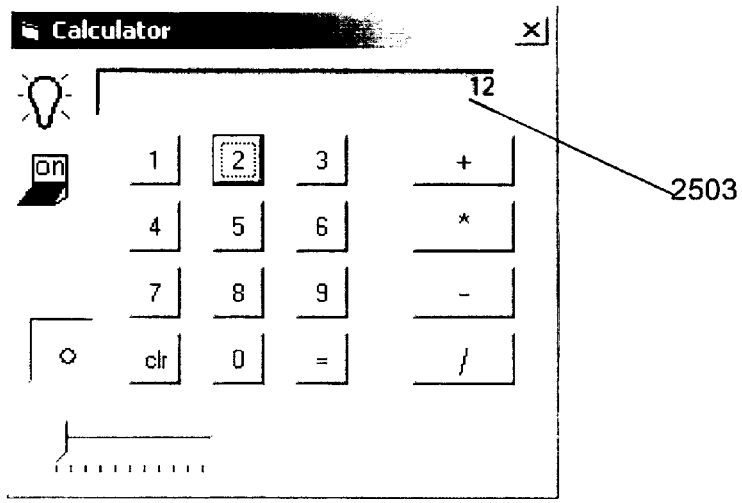
Figure 25B:
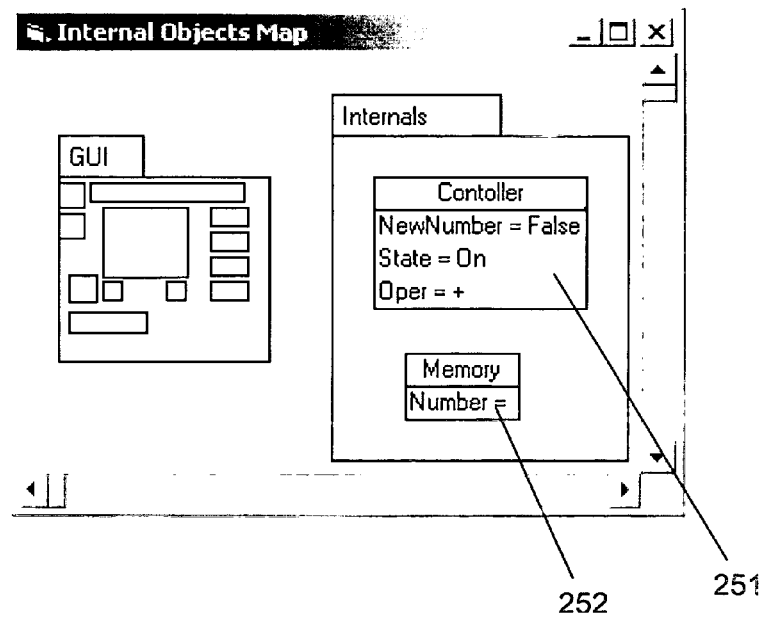
Figure 25C:
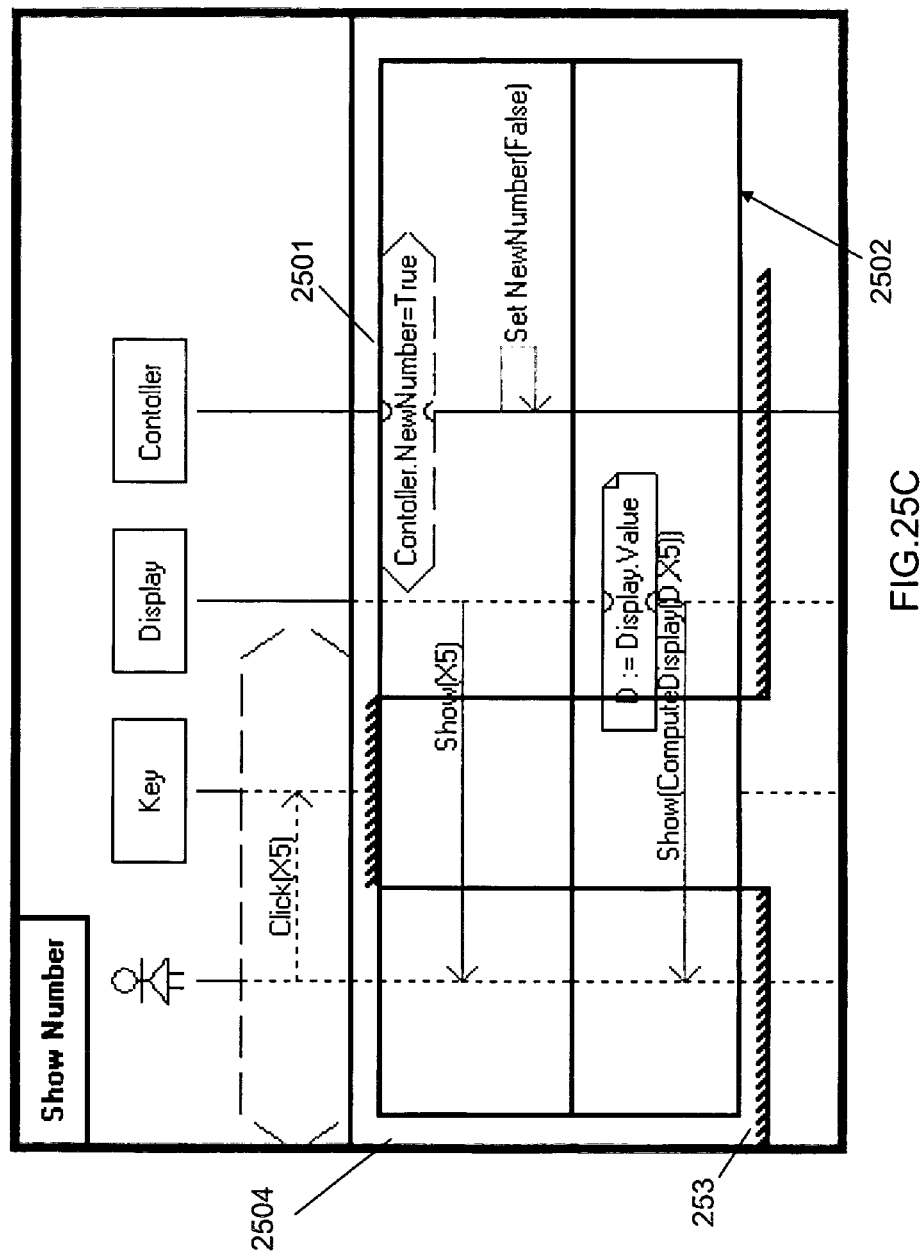

Reverting now to FIG. 25C, it illustrates a, "Show Number" chart that was activated by the click on 2. Since the controller's NewNumber was false (i.e. condition (2501) did not hold), it went to the Else part of the chart body (2502) and arranged for the new display value to be displayed for the new display value 12 (2503) (i.e. '12' as can be seen in the calculator GUI). This chart has essentially terminated, as can be seen from the cut (253) and is thus enclosed in a thick frame (2504). At this point a message to the user pops up—not shown—indicating that the chart has ended. Once the user OKs the message, the chart is closed. The bottom chart on the left, "Show Sum" (FIG. 25E), is at the point immediately after the '+' was clicked (2505) and the value of the display was stored in Num1. (concealed by the cut line (2506) ).

As may be recalled, the universal chart "drives" the model by its action/reaction nature, whereas existential charts can be used as system tests or as examples of required interactions. Rather than serving to drive the play-out, existential charts are monitored, that is, the play-engine simply tracks the events in the chart as they occur. By one embodiment when (and if) the chart reaches its end, it is highlighted and the user is informed that it was successfully traced to completion. By this embodiment, the user may select the charts to be monitored, thus saving the play-engine the need to track charts which might currently not be of interest.

Figure 25D:
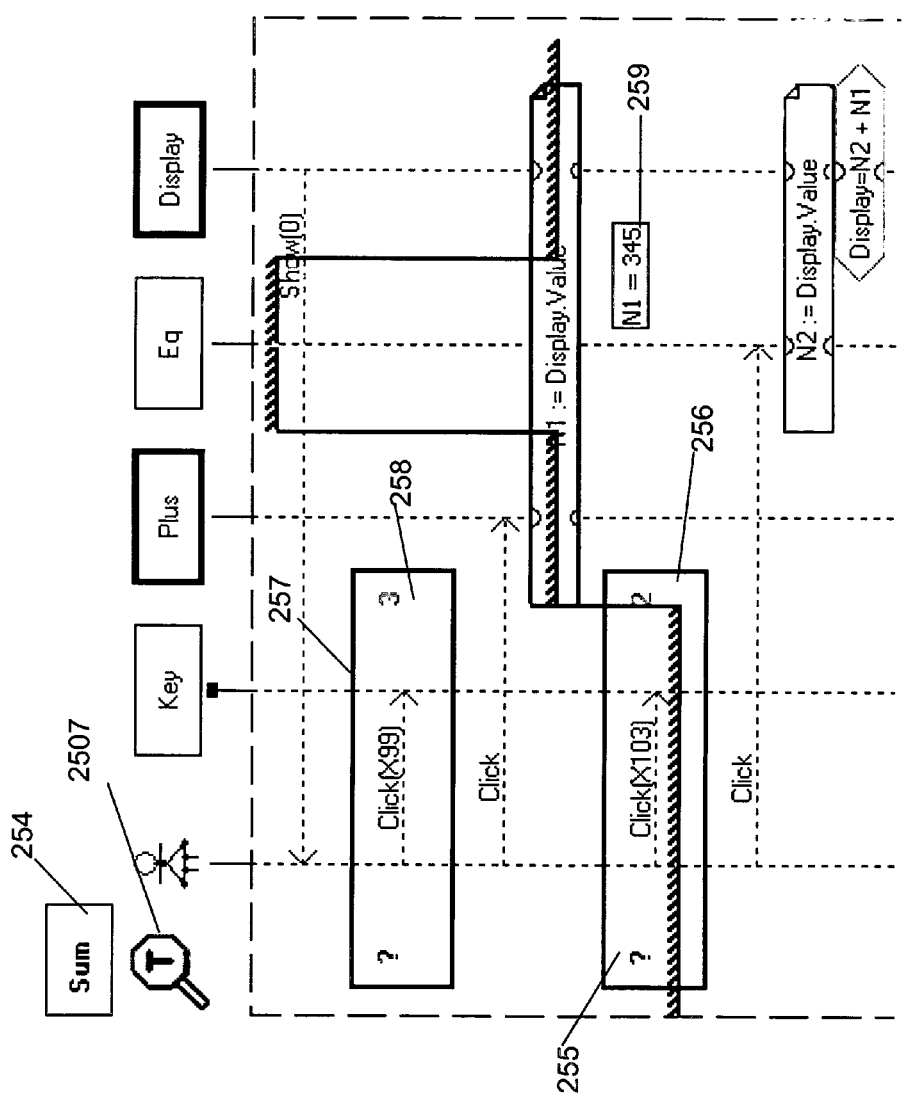

Turning now to FIG. 25D), there is shown an existential chart "Sample Sum" (254) which is being monitored, or traced, by the play-out (as indicated by the magnifying glass icon (2507)). The chart is currently inside the second loop (255), at the end of its second traversal, as the number 2 (256) shows, for the two digits 12. The first loop (257) was traversed three times (258), for the three digits 345.

In accordance with one embodiment the play-out can be used for testing. Thus, when playing out the GUI application, a run trace is produced, which includes all the user actions and the system reactions. These runs can be recorded, to provide testimonies (that can be replayed) for fulfilling existential LSCs. In re-playing a run, the user may select either or both of existential and universal charts to be traced, Existential LSCs can thus be shown to be fulfilled, and with universal charts the run shows when the charts were activated and how they participated in creating the system's reactions in the run. And, of course, the engine notifies if a universal chart is violated.

Recorded runs can be manipulated by the user, by changing the order of events and checking whether the resulting run is also a legal one. In accordance with an embodiment of the invention, all system reactions are deleted leaving only user and environment) actions. After applying this manipulation, the resulting run can be re-played. The user can then specify that universal charts should also be activated (and not only monitored). In this case, events from the recorded run are injected as before, but now the selected universal charts activate the system and trigger events as specified in their bodies. This feature may be used for regression testing, e.g. in the following way: While fulfilling (part of) the existential LSCs, the runs are recorded. Later on, if some of the universal charts change, the runs can be manipulated to contain only user actions and then re-played to verify that existential LSCs are still successfully fulfilled and no universal charts are violated.

By one embodiment, Recorded runs can be saved (e.g. in known per se semi-structures format, such as XML) and then reloaded. By one embodiment, runs can be imported from different sources and re-played in the same manner. These external sources can be different implementations of the specification, either given as executable programs or as more detailed design models, (e.g., statecharts [1]). Importing a run from an implementation and re-playing it, while tracing all charts, can be used to show that the implementation is consistent with the requirements in the sense that existential charts are successfully traced and universal charts are not violated.

Figure 26B:
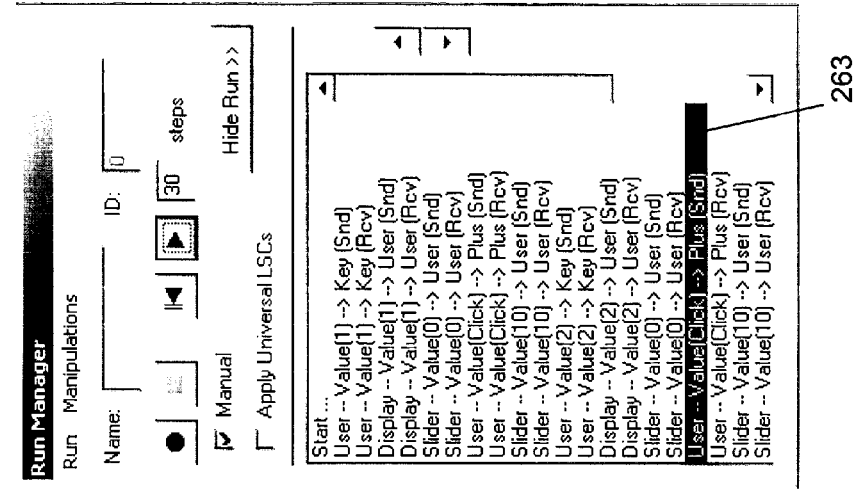
FIGS. 26A–C illustrate an exemplary execution sequence which caused violation of an existential chart, in accordance with an embodiment of the invention.
Figure 26A:
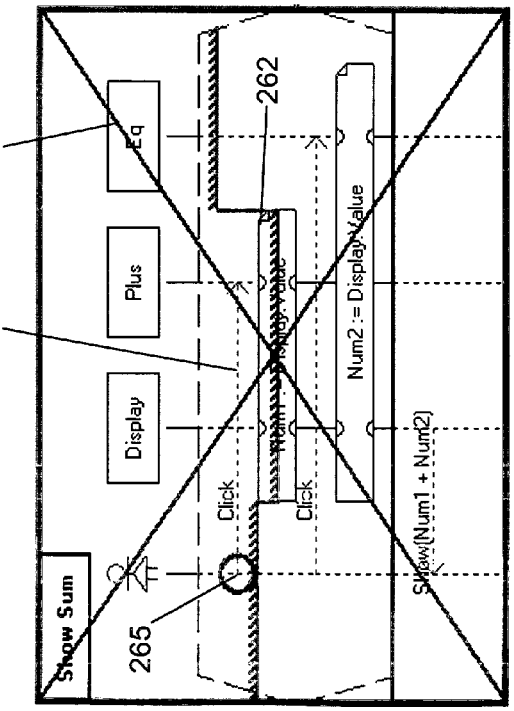
Figure 26C:
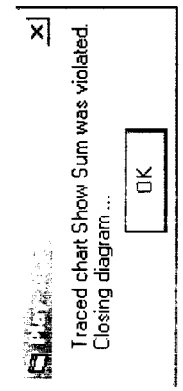

Turning now to FIGS. 26A–C, there is shown an exemplary execution sequence which caused violation of an existential chart, in accordance with an embodiment of the invention. By this embodiment the violation occurred during situation in which a replayed run causes a violation of an existential chart. The violation is caused since the run contains two clicks on the '+' button, whereas the chart (261) in FIG. 26A specifies only one. Note that the cut (262) indicates the stages to which the chart reached. When the second click is encountered (highlighted 263 in FIG. 26B), a violation is found. The play-engine indicates the violation by "crossing out" (264) the violated LSC, circling the violating event (265) and prompting the user with an error message (FIG. 26C). Other indications are, of course, applicable, all as required and appropriate.

Note that whereas the example illustrated with reference to FIG. 26 refers to violation during a replay run, the invention is, of course, not bound by this example and accordingly violating scenarios can occur during other modes of operation, e.g. during a regular play-out run of the kind described for example with reference to FIGS. 25A–D.

Figure 27:
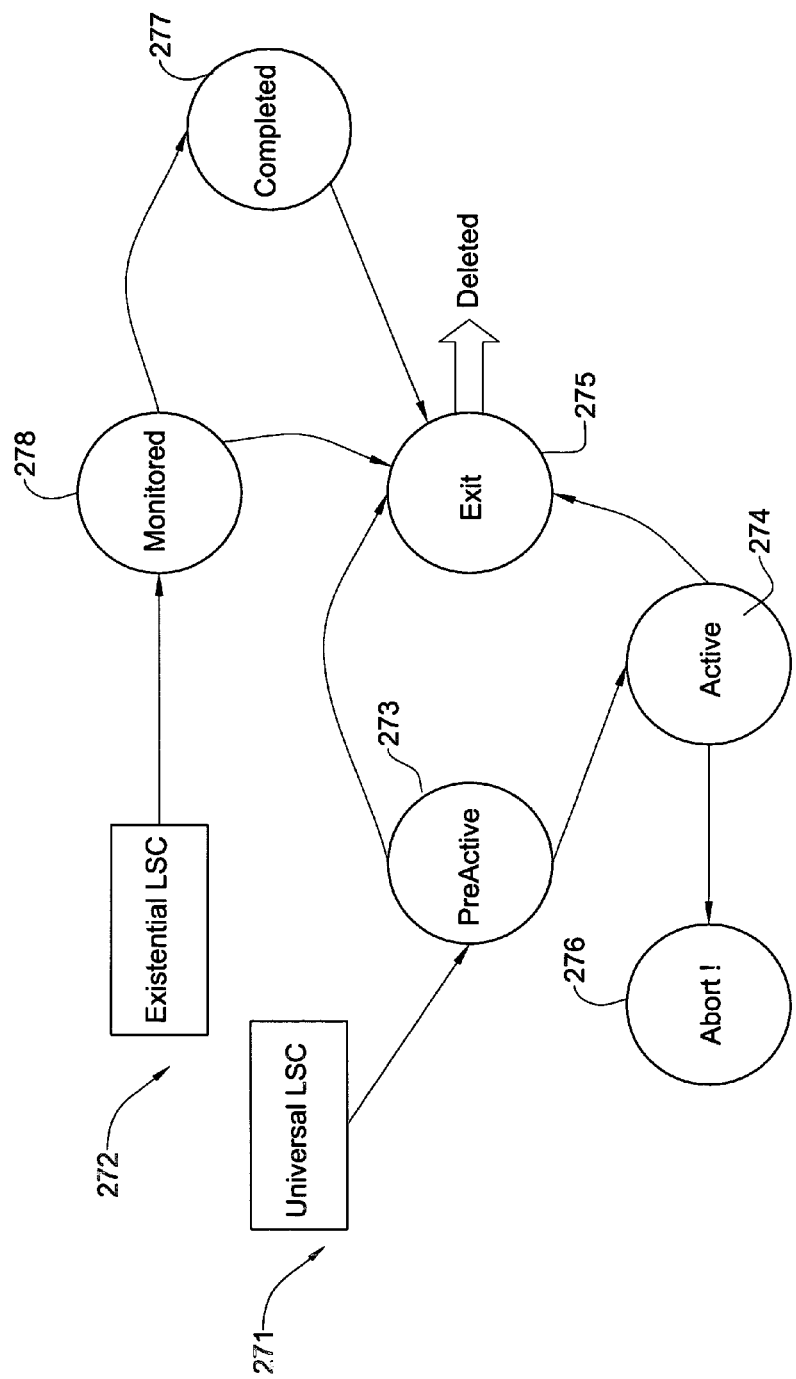
FIG. 27 illustrates a typical life cycle that an LCS chart can go through, in accordance with an embodiment of the invention.

FIG. 27 illustrates a typical life cycle of an LCS chart, in accordance with an embodiment of the invention.

Typically, although not necessarily, an LSC specification includes of several LSCs [3]. A single universal chart may become activated (i.e., its prechart is successfully completed) several times during a system run. Some of these activation's might overlap, resulting in a situation where there are several "live copies" of the same chart active simultaneously.

Bearing this in mind, the life cycle of an LSC live copy of an original LSC L (universal (271) and existential (272)) is illustrated in FIG. 27. Turning at first to the universal chart 271, a copy of an LSC L is created (designated preactive mode (273)) in response to the occurrence of a minimal event (minimal—as induced by the partial order of the LSC) appearing in the prechart of L. As long as events happen and conditions are reached and evaluated to true, the cut of the copy is propagated. When all locations in the prechart have been traversed, the copy moves to active mode (274). Again, as long as events happen and conditions are evaluated to true, the cut is propagated. If all locations in the chart have been reached, the copy terminates and stops existing (275). A copy is, likewise, terminated and stops to exist (275) if the prechart is violated or meets a false cold condition. Thus, a chart in active mode (274) exits in one of the following cases:

(first case) If a cold condition in the main chart is evaluated to false, the copy terminates and stops existing (i.e. moves to state 275). Note that an evaluation of a cold condition located in a sub-chart just changes the flow of events but does not cause the copy to terminate.

(second case) If the chart is violated by an event (i.e., sending or receiving a message before or after it is allowed by the chart) and the temperature of the current cut is cold, the copy terminates and stops existing (i.e. moves to state 275).

(third case) If the chart is violated by an event (i.e., sending or receiving a message) and the temperature of the current cut is hot, the algorithm aborts (i.e. moves to state 276), since an illegal run was just produced.

(fourth case) If a hot condition is evaluated to false, the algorithm aborts (276), since an illegal run was just produced.

The fourth case is presented only for completeness. It will not occur during the execution of the algorithms, since these algorithms will avoid the evaluation of false hot conditions. The third case cannot be totally prevented by choices of the algorithms, since violating events may be caused by the user or the environment. However, the algorithms will avoid the initiation of violating events. This policy may yield a situation where the play-engine does not trigger events dictated by one chart, because of other charts forbidding them.

Existential LSCs (272) go through a similar, though simpler, life cycle. When one of the minimal events in the chart happens, the copy is created and enters a so called monitored state (278). If the chart is violated, it is simply exited and deleted (move to state (275)). If the chart completes successfully, it moves through a temporary completed state (277) where different registration and management actions can be taken (e.g., registering that this chart was satisfied by at least one run) and then is exited and deleted (275).

Note that the invention is not bound by an LSC system behavior specification discussed with reference to the playing-out aspect of the invention, and a fortiori it is not bound by the particular case where LSCs are used. Note that the specified life cycle sequence described with reference to FIG. 27 may be modified, all as required and appropriate, depending upon the particular application.

While executing an LSC model, there are some kinds of non-deterministic choices that have to be made. These choices may be implementation dependent, as in many simulation/execution tools. By one embodiment the user is provided with some control over these decisions. By this embodiment this is done using policies. Policies are ways for the user to control some of the parameters dominating the decision procedure for non-deterministic choices.

Non-determinism arises from the interleaving characteristics of the execution algorithms. While executing LSCs, there may be several cases where the choice of what should be done next is non-deterministic. One example of such a choice is simply choosing the next event to be activated from a set of some possible charts.

Another choice is that of when to evaluate a condition. One option is to evaluate it as soon as it is reached, regardless of its value. Another option is to delay the evaluation until the condition becomes true, and another option is to delay the evaluation until it becomes false.

Order of Executed Events

This non-determinism concerns the order in which events are searched through the specification. The user may define an LSC search list and a search policy. The search list dictates the order in which LSCs are searched for the next event to be activated. The policy is a simple flag that may be assigned a value from a so called Deep, Wide states. If the Deep policy is taken, the algorithm will always try to pick the next event from the first LSC in the list. If no such event may be taken, it will look in the second LSC and so on. In this way, the algorithm tries to complete the LSCs in the order specified by the user. If, on the other hand, the Wide policy is taken, the algorithm will try to pick one event from each LSC in the order they are located in the search list. In this way, the algorithm tries to be fair by propagating all active LSCs side by side. This policy is referred to herein as Event Search Policy.

Timing of Condition Evaluation

This non-determinism concerns the timing of cold conditions valuation. The policy may take any pair of values from {Immediate, Delray, Random}×{True, False, $\Phi$}. The first value determines whether conditions are evaluated as soon as they can (i.e. Immediate), or delayed (i.e. Delray) until no other event may be taken. Random means that the decision of whether to evaluate a condition will be chosen randomly for every condition. The second value {True, False, $\Phi$} determines whether the algorithm tries to evaluate conditions to true or to false. By trying, it is meant that if the policy value is true(false), then the algorithm will evaluate the conditions and propagate only those that are evaluated to true(false) respectively. Choosing $\Phi$ (don't care) as the second value means that conditions are evaluated and the appropriate actions are taken, regardless of their value. Note that this policy of condition evaluation may (and probably will) be violated during a system run, since it could be the case that there is nothing to do except to progress through a false condition, even when the policy value is true. This policy is referred to herein as Condition Evaluation Policy. Note that the condition evaluation policy is valid only for cold conditions. Hot conditions are never evaluated to false and are always evaluated to true as soon as possible. When a false hot condition is encountered, the chart will wait until either the condition becomes true or the chart is violated by some event. When timing constrains are integrated into the play-engine, conditions may be associated with time limits constraining the maximum time until they become true.

Maximal vs. Safe System Runs

There are two approaches that can be taken when trying to execute an LSC specification. The maximal approach tries to activate as many charts as possible and keeps them active as long as possible by avoiding the triggering of violating events. This approach is called maximal since it usually causes maximal reactions of the application. The opposite approach is the safe one. According to this approach, an attempt is made to violate as many precharts as possible, by choosing events from other charts that violate these precharts. By violating precharts, the potential risk of entering states where an event may violate an already active chart is minimized, thus causing system error. Using the safe approach may result in choosing an order of events that will cause some of the specified system reactions not to be applied. The Max-Safe policy takes values from {Max, Safe} When Max is chosen, the algorithms will first try to find an event that does not violate any prechart, and only if none is found an event that violates precharts will be picked. When Safe is chosen, the algorithms will first look for events that violate some prechart, and only if none exists, some other event will be selected.

Note that the invention is not bound by the specified policies, or by their proposed specific implementation.

Figure 28:
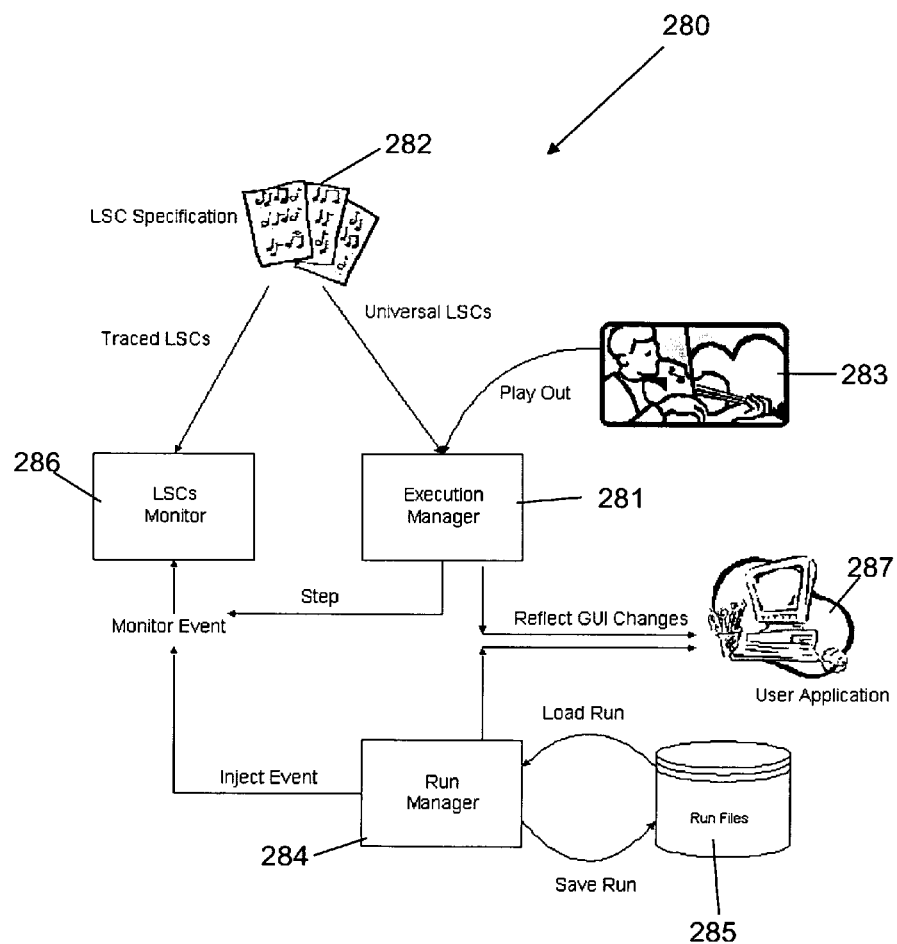
FIG. 28 illustrates a generalized block diagram of a play-out system, in accordance with an embodiment of the invention.

Turning now to FIG. 28, there is shown a generalized block diagram of a play-out system (280), in accordance with an embodiment of the invention. The invention is not bound by either the specified architecture or by the structure of each module.

By this embodiment the Execution Manager (281) is the main component, responsible for processing user actions, activating universal charts of the LSC chart collection (282) and generating system reactions as dictated by the active universal charts in response to a played-out scenario by the user (283). The Run Manager (284) is responsible for recording runs, saving them to files (in Run file database (285)), loading runs from files (in the same database) and re-playing loaded runs. Both components (281 and 284) send information about the events played, generated and re-played to the LSCs Monitor (286), which is responsible for managing and monitoring the LSCs selected to be traced. The execution manager and run manager also send information about generated and re-played scenarios to the GUI application (287), so it can reflect the changes that result from system reactions.

Figure 29:
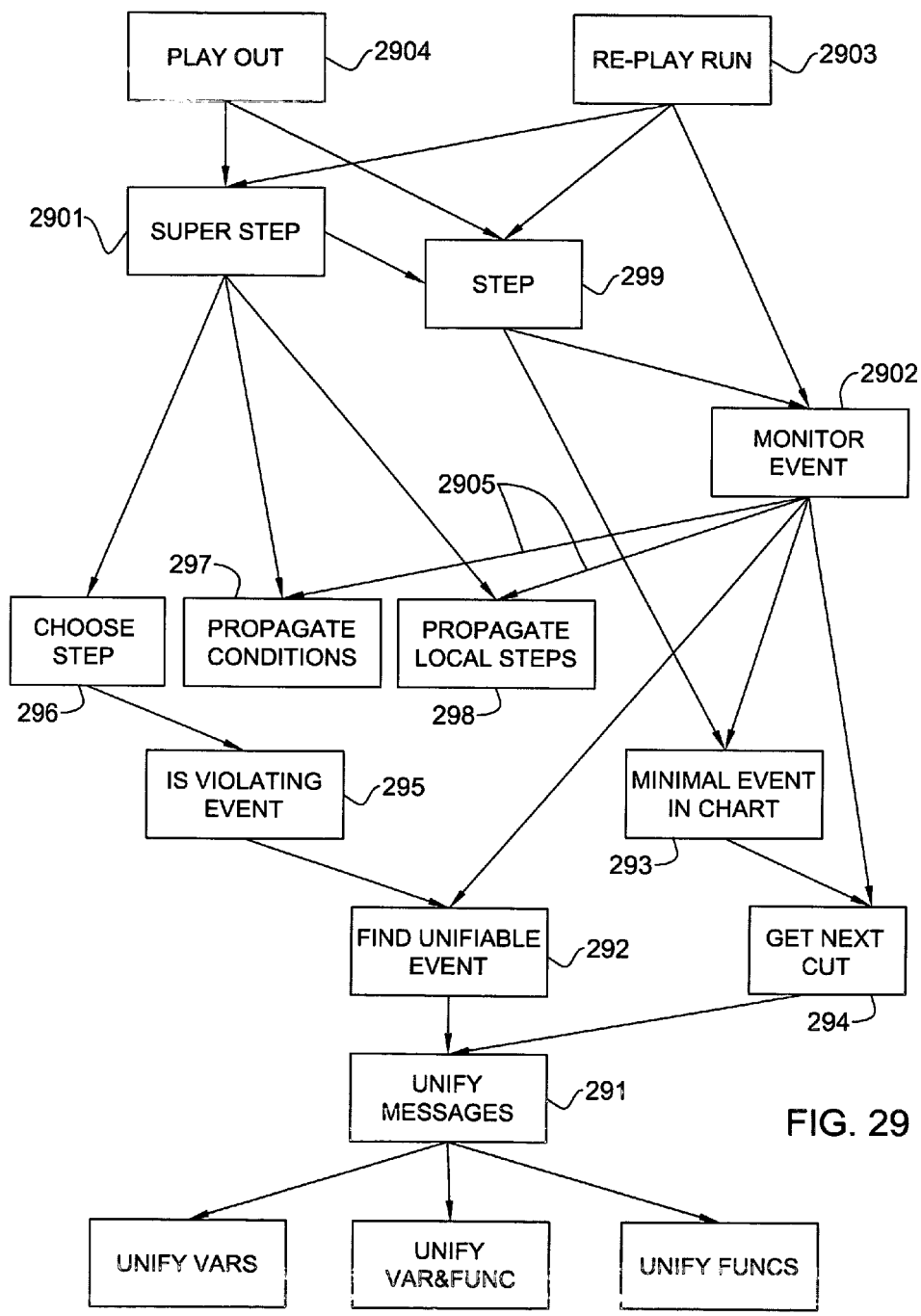
FIG. 29 illustrates a more detailed block diagram of the various functions utilized by the sub-processes of the play-out engine, in accordance with a preferred embodiment of the invention.

FIG. 29 illustrates a more detailed block diagram of the various functions utilized by the sub-processes of the play-out engine, in accordance with a preferred embodiment of the invention.

Note that by one embodiment the procedure Play-out belongs to the Execution Manager (281 in FIG. 28), the procedure Replay-Run belongs to the Run-Manager (284 in FIG. 28) and the procedure Monitor-Event belongs to the LSC monitor (286). All other procedures and functions serve more than one component.

The description of the function calls tree is described "bottom-top", i.e. from bottom to top with reference to FIG. 29.

Turning at first to the Unify Messages function (291), it handles messages unification. Since messages may be symbolic and contain variables as well as functions, it is required to determine when two messages can be unified. Unification is the action of checking whether two messages can be matched. Messages are unifiable if they have the same source and target objects, have the same structure, and if containing any variables, their variables should be unifiable. One should distinguish between positive unification and negative unification.

A positive unification is used to find enabled events that can be advanced simultaneously, and negative unification is used, on the other hand, to find events that may cause chart violation if some event is to be carried out. In A positive unification the binding of variables is allowed, while in negative unification it is not. Thus, if there is a disabled event whose variables are not bounded, it will not be unified with an event that is about to be carried out, and thus will not cause violation. This approach is taken since it could be that by the time the event is enabled it will be bound to other values.

Two variables can be unified if they are both bound to the same value or if one is free and the unification is positive. If one variable is free, it is assigned the value of the second, and if both are free, they are simply connected. If one of these variables is later unified with another variable and assigned a value, all the variables connected to it will be bound to the same value.

A variable can be unified with a function, if both are bound and the function evaluates to the variable value, or if the function is bound and the variable is free. In the latter case, the variable is assigned the value of the function. The function Unify Var & Func performs these checks.

Two functions can be unified only if they are instances of the same function, both have all their parameters bound to some actual values and they evaluate to the same value. The function Unify Funcs performs these checks.

There are several places through the play-out algorithm where it is required to find an event e, in a given chart, that matches another event e. For example, valid events are searched to check if they can be progressed. Active LSC copies are also searched to see if a violation was caused by some event. In addition, events arm checked if they are minimal in precharts of universal charts or in the body of existential charts, so these charts can be activated when needed.

The function Find Unifiable Event (292) gets an event and an LSC and determines whether there is an event in the chart that is unifiable with the given one. The procedure (292) scans the appropriate locations of the correct instance, looking for an event that can be unified with the given one. If such an event is found it is returned. Otherwise, the procedure returns nothing.

The recursive function Get Next Cut (294) receives an LSC with a given cut and an event. This function determines whether there is a unifiable event in the chart that is reachable from the given cut by performing local steps. These local steps include performing assignments, evaluating conditions, entering flow constructs, and in the case of dynamic loops (which the user may indicate should be carried out 0 times) even skipped. The function returns, except for the unifiable event, also the new cut, since it could be that other instances that are not directly involved with the event have changed their location.

The function Minimal Event in Chart (293) receives an LSC and an event and determines whether there is a minimal event (according to the partial order induced by the LSC) that is unifiable with the given one. The function uses Get Next Cut since it could be that the event may be reached only after propagating some local elements.

Is Violating Event (295) is a function that determines whether a given event has a matching unifiable event, in the currently active LSC copies, that may cause chart violation if performed. An event is violating if it exists in the chart but is not enabled by the current cut.

The function Choose Step (296) is responsible for finding the next event to be carried out. It searches through the live LSC copies and tries to find an event that does not violate any other chart, according to the Event Search Policy discussed above.

The procedures Propagate Conditions (297) looks for conditions that may be evaluated (all participating instances are located at the condition location) and evaluates them according to the condition evaluation policy discussed above. The procedure gets an input parameter, Force-Progress (not shown in FIG. 29) that, if set to true, forces the procedure to propagate at least one condition, regardless of the condition evaluation policy. This parameter will be used when there are no events that can be taken, and by moving past some conditions, some of the events may become enabled.

The Procedure Propagate-Local-Steps (298) propagates instances by performing steps other then sending messages or receiving them. These steps are local because they do not affect the GUI application and do not have to be synchronized with other steps in different charts. Local steps include: performing assignments, entering control structures (e.g., loops and If-Then-Else constructs) and exiting them. This procedure also handles loop iterations, by going back to the beginning of a loop, when its end is encountered before the specified number of iterations has been performed. Due to their local nature, these steps may be carried in any order as long as compliant with the partial order induced by the LSCs. Local steps are performed as soon as they are encountered. As in Propagate-Conditions (297), this procedure also returns an indication whether any progress was achieved.

The procedure Step (299) is responsible for executing a single event. Given an event, this procedure finds all the enabled events that are unifiable with the given one, advances the appropriate copies, activates universal charts that have this event as a minimal one in their prechart and terminates charts that are completed or violated.

The procedure Super-Step (2901) tries to perform as many steps (note that the terms "step" and "event" are interchangeable) as possible (excluding user and environment initiated actions). Super-Step works in iterations, where in each iteration it chooses a step to be taken and then performs it. Between any two steps, the procedure tries to evaluate conditions according to the condition evaluation policy and to propagate local steps. During play-out, this procedure is invoked after every user action, thus causing the system to complete its derived reaction to that action.

The procedure Monitor Event (2901) is very similar to Step (299), in the sense that it also finds all the events that are unifiable with the one to be carried out and tracks them. It activates traced charts when one of their reachable minimal events occurs and closes them when completed or violated. The main difference is that this procedure is more "passive" than Step, in the sense that it waits for an event to happen before it evaluates conditions or enters loops, so that these actions will be taken only when needed and will not block other potential courses of progress. This difference is shown in the diagram by the arrows (2905) denoting that the procedures used to propagate local steps and conditions are variants of those used by the procedure Step (299). As can be recalled, when encountering a dynamic loop while executing a universal chart, the user is prompted for the number of iterations the loop should be performed. When monitoring the chart, the user does not have to specify the number of iterations, but rather, the engine tracks the events and decides when a loop is over (i.e., by identifying the occurrence of an event immediately following the loop). Therefore, when propagating local steps, the engine does not decide when a loop is over after the last event in it occurs, but only after the first event outside the loop occurs. Another difference is the way If-Then-Else constructs are handled. When encountering such a construct while executing a chart, the condition is evaluated and instances are propagated to the If part or the Else part accordingly. This is done, since the system should usually respond in some way, according to the condition value. When tracing a chart and encountering such a construct, the condition is not evaluated. Only after the next event occurs, the condition is evaluated and the cut is propagated. This policy suits the idea of monitoring and tracing a chart much better, since it is unknown when the event will occur and, therefore, it is not desired to commit to one part of the construct.

Figure 20:
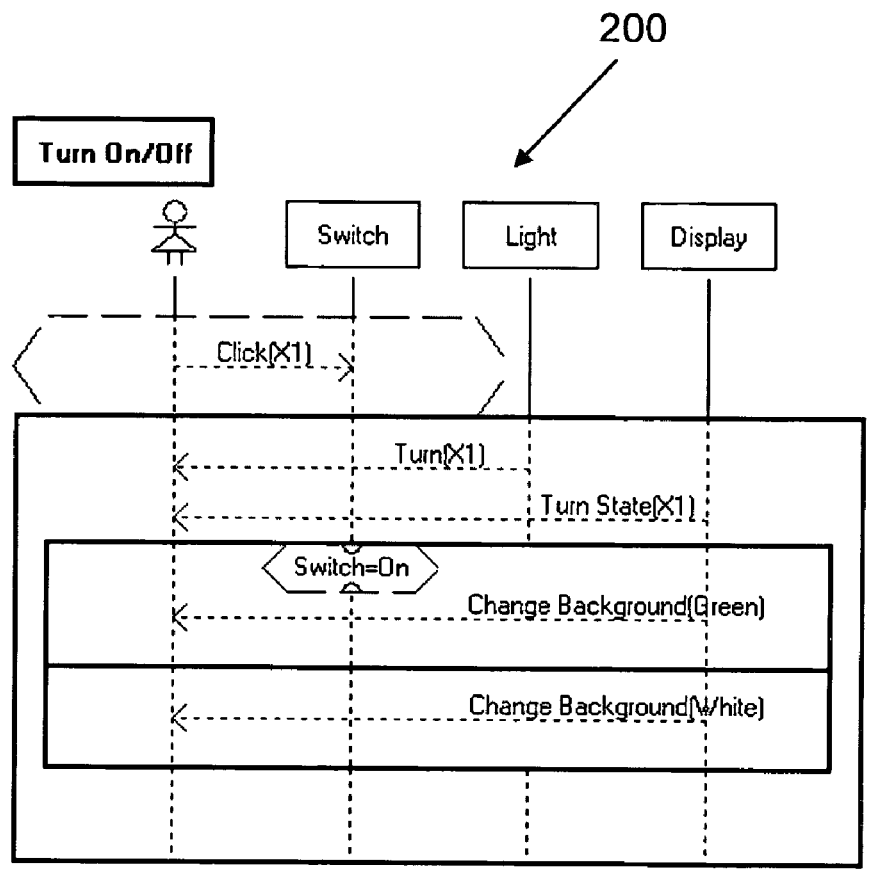

Those versed in the art will readily appreciate that the invention is by no means bound the particular structure described with reference to FIG. 20. The latter illustrates only one out of many possible variants of realizing a play-out engine of the invention.

Bearing in mind the description of the functions above, the procedure, in accordance with this embodiment, for playing out a scenario (2904) by the user is relatively simple. After the user enters play-out mode, he/she operates the system by demonstrating user and external environment actions through the system GUI. Each such action is considered by the play-engine as a step. After this step is executed, the procedure performs a following super step. This super step consists of all the system reactions that should follow the user action, according to the participating universal charts. After a user action is performed, an event with bounded variables (according to the values demonstrated by the user) is created and unified with potential events in the various LSCs. For example, if some event specified in an LSC, says that the user clicks some key X__1 (constituting a bound variable), then if the user clicks 5, X__1 is set to 5. This value will be used in all consecutive events that utilize X__1.

As specified above, runs can be re-played in the play-engine environment (2903 in FIG. 29). Re-playing a run is done by going through the list of events and injecting them to the LSCs-Monitor so they can be monitored. A run can also drive universal LSCs. This is usually useful when the run contains only user and environment events, thus used as a "recording" of a regression test. If the option of activating universal charts is chosen, every event is sent to the procedure Step (299 in FIG. 29) instead of Monitor-Event (2902 in FIG. 29), and then a Super-Step (2901 in FIG. 21) is performed to complete the derived system response.

Figure 30:
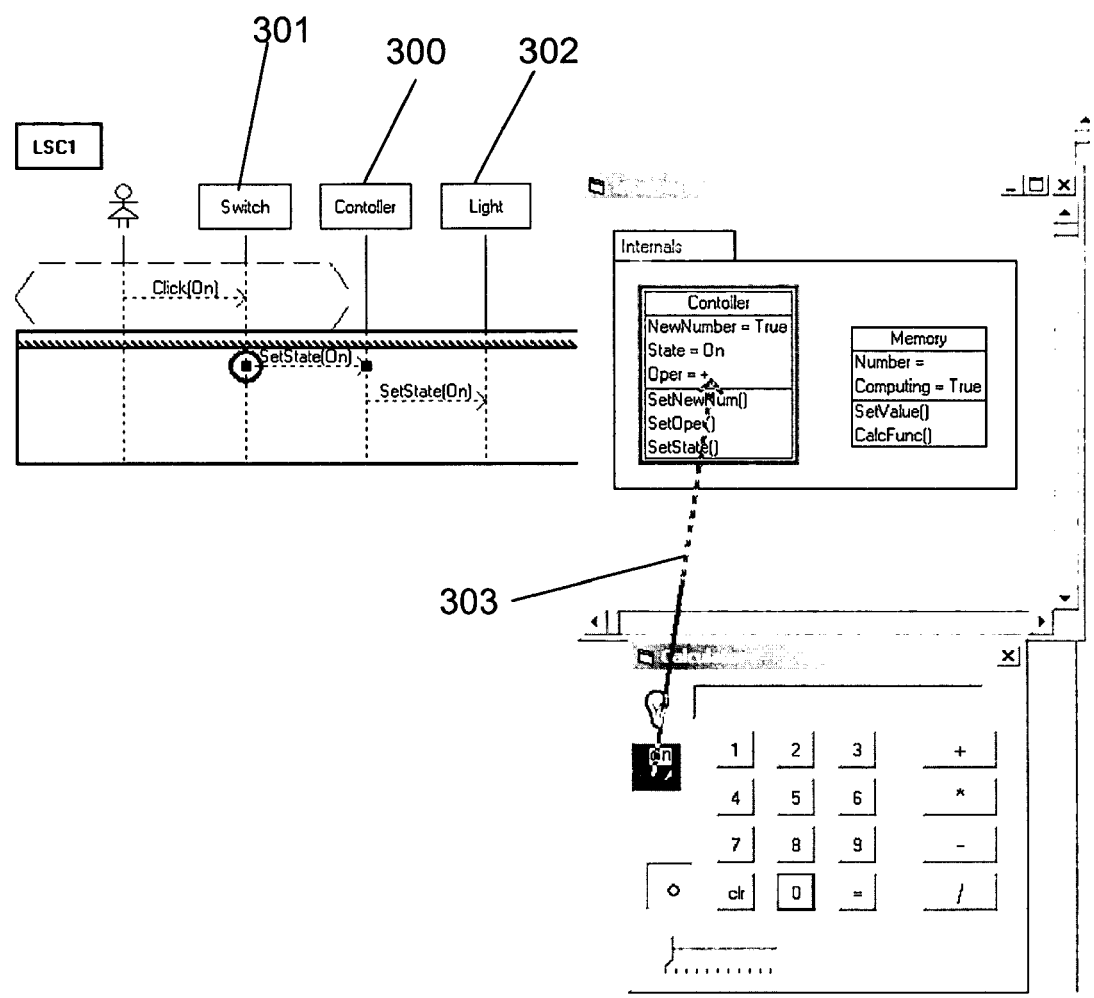
FIG. 30 shows a screen layout illustrating an exemplary partial play-out session of a calculator application, in accordance with a modified embodiment of the invention.

FIG. 30 shows a screen layout illustrating an exemplary partial play-out session of a calculator application, in accordance with a modified embodiment of the invention. By this modified embodiment an internal object, i.e. a controller (300) is also participating, and the interaction between the controller and the switch (301) and the light (302) is shown When LSCs containing method calls are played out, the play-engine animates the method calls by drawing arrows between the involved objects and highlighting them (303). Thus, the play-out mechanism can be used not only to enable end-users to validate requirements but also as a useful tool for demonstrating, reviewing and debugging a design. FIG. 30 shows how interaction between objects is animated in the play-engine. Note that the arrow is not limited to the GUI application or to the objects map, but can go from one to the other.

In the method claims that follow, alphabetic characters or roman symbols used to designate claim steps are provided for convenience only and do not imply any particular order of performing the steps.

It will also be understood that the apparatus according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The present invention has been described with a certain degree of particularity, but those versed in the art will readily appreciate that various alterations and modifications may be carried out without departing from the scope of the following claims:

The invention claimed is:

1. A method of specifying a behavior of a system, comprising:
　(i) providing a Graphic User Interface (GUI) for a system, whose behavior is being specified, said GUI including at least one object which has at least one property that does not change in reaction to an input unless change is described during playing in;
　(ii) playing-in a scenario by performing the following steps (a), (b), (c) as many times as required:
　　(a) receiving description of at least one input;
　　(b) receiving description of change in at least one property of at least one object of said GUI in reaction to at least one of said inputs; and
　　(c) changing said at least one property of said at least one object in accordance with said received description of change; and (iii) automatically constructing at least part of a formal system behavior specification that corresponds to the scenario, based at least partly on said playing in.

2. The method according to claim 1, wherein said step (ii) further includes at least one of the following:
   a) describing user action input by operating at least one of said objects;
   b) describing environment action input by operating at least one of said objects; and
   c) describing said change by operating at least one of said objects.

3. The method according to claim 1, wherein said objects include at least one internal object and wherein said step (ii) includes operating at least one internal object.

4. The method according to claim 3, wherein said system GUI includes an object map and further comprising the step of: reflecting in the object map the result of the playing-in.

5. The method according to claim 1, wherein said description is provided through operating at least one of said objects.

6. The method according to claim 1, further comprising the step of: defining at least one control construct and wherein said step (iii) includes constructing formal system behavior specification that corresponds to the control construct.

7. The method according to claim 6, wherein said control construct step includes creating generalization and loops selected from the group that includes dynamic loops, unbound loops and fixed loops.

8. The method according to claim 1, wherein said step (iii) includes constructing symbolic messages.

9. The method according to claim 1, wherein said formal system behavior specification being at least one Live sequence chart (LSC).

10. The method according to claim 9, further comprising the step of: selectively modifying at least one of said charts.

11. The method according to claim 1, wherein said formal system behavior specification being Temporal logic language.

12. The method according to claim 1, wherein said formal system behavior specification being at least one Symbolic timing diagram.

13. The method according to claim 1, wherein said formal system behavior specification being at least one Timed Buchi Automata.

14. The method according to claim 1, further comprising:
   (iv) playing-out said scenario by performing the following steps (d) and (e) as many times as required:
      (d) receiving said description of said at least one input; and
      (e) in response to at least one of said inputs, changing said at least one property of said at least one object in accordance with said constructed formal system specification.

15. The method according to claim 14, wherein said playing-out is used to construct a prototype.

16. The method according to claim 14, wherein said playing-out is used to construct a tutorial.

17. The method according to claim 14, wherein said playing-out is used to construct a final implementation of a system.

18. The method according to claim 1, further comprising the step of:
   defining at least one condition that may or must hold regarding the system, and wherein said step (iii) includes constructing formal system behavior specification that corresponds to said at least one condition.

19. The method according to claim 18, wherein at least one of said conditions includes defining condition regarding one or more of said objects.

20. A computer program product that includes a storage medium storing a computer code for implementing the method steps of claim 1.

21. An apparatus for specifying a behavior of a system, comprising:
   a processor, a Graphic User Interface (GUI) of the system whose behavior is being specified, said GUI including at least one object which has at least one property that does not change in reaction to an input unless change is specified during playing-in; and
   a play engine configured to play in scenarios by receiving descriptions of inputs, receiving descriptions of changes in properties of objects of said GUI in reaction to inputs, and changing properties of objects of said GUI in accordance with said received descriptions, and configured to construct at least part of a formal system behavior specification corresponding at least partly to said played in scenarios.

22. A method for playing out a scenario, comprising:
   (i) providing Graphic User Interface (GUI) of a system whose behavior is specified in a formal system behavior specification, said GUI including at least one object which has at least one property that does not change in reaction to an input except in accordance with said formal system behavior specification, and
   (ii) playing-out a scenario by performing the following steps (a) and (b) as many times as required:
      (a) receiving description of at least one input; and
      (b) changing at least one property of at least one object of said GUI in reaction to at least one of said described inputs in accordance with said formal system behavior specification.

23. The method according to claim 22, wherein said formal system behavior specification being at least one Live sequence chart (LSC).

24. The method according to claim 23, wherein said system behavior specification includes existential charts and universal charts, and wherein said universal charts include user action part and system reaction part.

25. The method according to claim 23, wherein said LSC charts include at least two live copies of the same chart simultaneously.

26. The method according to claim 22, wherein said formal system behavior specification being Temporal logic language.

27. The method according to claim 22, wherein said formal system behavior specification being at least one Symbolic timing diagram.

28. The method according to claim 22, wherein said formal system behavior specification being at least one Timed Buchi Automata.

29. The method according to claim 22, wherein said playing out includes: testing the behavior of the system directly from the system behavior specification.

30. The method according to claim 29, wherein said testing includes running scenarios and forbidden scenarios.

31. The method according to claim 22, further comprising the step of recording at least one played out scenario, constituting a run.

32. The method according to claim 22, further including the step of: indicating if the system behavior specification or portion thereof is successful or violated.

33. The method according to claim 22, wherein said system behavior specification includes existential charts and universal charts, and wherein said universal charts include user action part, environment action part and system reaction part, and further including the step of providing a run that includes either or both of user and environment part and system reaction part, constituting a played scenario, and re-playing the run.

34. The method according to claim 33, further comprising the step of providing either or both of the user action part and environment action part of said run, replaying the run and indicating if the existential charts are successful or violated.

35. The method according to claim 22, wherein said system behavior specification includes existential charts and universal charts, and wherein said universal charts include user action part, environment action part and system reaction part, and further comprising the step of, tracing either or both of said existential and universal charts, and indicating if a chart is successful or violated.

36. The method according to claim 22, wherein said objects include at least one internal object and wherein said step further includes operating at least one internal object.

37. The method according to claim 36, wherein said system GUI includes an object map and further comprising the step of: reflecting in the object map the result of the playing-out.

38. The method according to claim 22, wherein said description is provided through operating at least one of said objects.

39. The method according to claim 22, wherein said playing-out is used to construct a prototype.

40. The method according to claim 22, wherein said playing-out is used to construct a tutorial.

41. The method according to claim 22, wherein said playing-out is used to construct a final implementation of a system.

42. A computer program product that includes a storage medium storing a computer code for implementing the method steps of claim 22.

43. The method according to claim 22, further including animating interaction between GUI objects.

44. The method according to claim 22, wherein said formal system behavior specification includes at least two Live Sequence Charts (LSC), each specifying an object property change in reaction to a same input; and wherein said changing said at least one property includes taking into account said specified object property change in at least one of said at least two charts prior to changing said at least one property of said at least one object of said system in reaction to said same input.

45. An apparatus for playing out a scenario in a system, comprising:

a processor, a Graphic User Interface (GUI) of the system whose behavior has been at least partly specified in a formal system behavior specification, said GUI including at least one object which has at least one property that does not change in reaction to an input except in accordance with said formal system behavior specification; and a play engine configured to play out scenarios by receiving descriptions of inputs, and configured to change properties of objects in reaction to inputs in accordance with said formal system behavior specification.

46. The apparatus according to claim 45, wherein said playing out is used to construct a prototype.

47. The apparatus according to claim 45, wherein said playing-out is used to construct a tutorial.

48. The apparatus according to claim 45, wherein said playing-out is used to construct a final implementation of a system.

* * * * *